United States Patent
Douglas et al.

(10) Patent No.: US 11,679,419 B2
(45) Date of Patent: Jun. 20, 2023

(54) EFFICIENT MATERIAL RECOVERY FACILITY

(71) Applicant: AMP Robotics Corporation, Louisville, CO (US)

(72) Inventors: Cameron D. Douglas, Boulder, CO (US); Geoffrey N. Chiou, Broomfield, CO (US); Matanya B. Horowitz, Golden, CO (US); Mark Baybutt, Superior, CO (US); Travis W. Martin, Louisville, CO (US); Kevin M. Ehlmann, Lafayette, CO (US); Jason M. Calaiaro, Denver, CO (US); Robert M. Espinosa, Conifer, CO (US)

(73) Assignee: AMP Robotics Corporation, Louisville, CO (US)

( * ) Notice: Subject to any disclaimer, the term of this patent is extended or adjusted under 35 U.S.C. 154(b) by 0 days.

(21) Appl. No.: 17/409,624

(22) Filed: Aug. 23, 2021

(65) Prior Publication Data

US 2022/0105545 A1 Apr. 7, 2022

Related U.S. Application Data

(60) Provisional application No. 63/087,045, filed on Oct. 2, 2020.

(51) Int. Cl.
*B07C 5/36* (2006.01)
*B07C 5/342* (2006.01)
*B29B 17/02* (2006.01)

(52) U.S. Cl.
CPC .............. *B07C 5/361* (2013.01); *B07C 5/342* (2013.01); *B07C 2501/0054* (2013.01); *B29B 2017/0279* (2013.01)

(58) Field of Classification Search
CPC .......... B07C 5/342; B07C 5/361; B07C 5/368; B07C 2501/0054; B29B 2017/0279
See application file for complete search history.

(56) References Cited

U.S. PATENT DOCUMENTS

| | | | |
|---|---|---|---|
| 6,079,542 A * | 6/2000 | Blood | B07C 5/342 198/384 |
| 6,401,936 B1 | 6/2002 | Isaacs | |
| 8,013,267 B2 | 9/2011 | Stemmle | |
| 8,615,123 B2 | 12/2013 | Dabic | |
| 10,207,296 B2 | 2/2019 | Garcia | |
| 10,625,304 B2 | 4/2020 | Kumar | |
| 10,710,119 B2 | 7/2020 | Kumar | |

(Continued)

*Primary Examiner* — Michael McCullough
*Assistant Examiner* — Kalyanavenkateshware Kumar
(74) *Attorney, Agent, or Firm* — Van Pelt, Yi & James LLP

(57) ABSTRACT

An efficient material recovery facility is disclosed, including: a first sorting device configured to: process a first instruction to remove a first target item from a set of items; and in response to the first instruction, perform a first sorting action to remove the first target item from the set of items, wherein the set of items excluding at least the first target item is to be transported towards a second sorting device, wherein the second sorting device is associated with a same sorting device type as the first sorting device; and wherein the second sorting device is configured to perform a second sorting action to remove a second target item from the set of items excluding at least the first target item in response to receiving a second instruction to remove the second target item.

20 Claims, 15 Drawing Sheets

(56) References Cited

U.S. PATENT DOCUMENTS

| | | |
|---|---|---|
| 10,722,922 B2 | 7/2020 | Kumar |
| 2004/0024716 A1 | 2/2004 | Malatesta |
| 2017/0232479 A1 | 8/2017 | Pietzka |
| 2019/0030571 A1 | 1/2019 | Horowitz |
| 2019/0091730 A1* | 3/2019 | Torang .................. B07C 5/36 |
| 2019/0247891 A1* | 8/2019 | Kumar ................ B07C 5/3422 |
| 2020/0143127 A1* | 5/2020 | Wagner ................ B65G 47/91 |
| 2020/0254490 A1* | 8/2020 | Lundahl ................ B65G 43/08 |
| 2020/0290088 A1 | 9/2020 | Kumar |
| 2020/0368786 A1 | 11/2020 | Kumar |
| 2021/0229133 A1* | 7/2021 | Kumar ..................... B07C 5/34 |
| 2021/0346916 A1 | 11/2021 | Kumar |
| 2022/0016675 A1 | 1/2022 | Kumar |
| 2022/0023918 A1 | 1/2022 | Kumar |

* cited by examiner

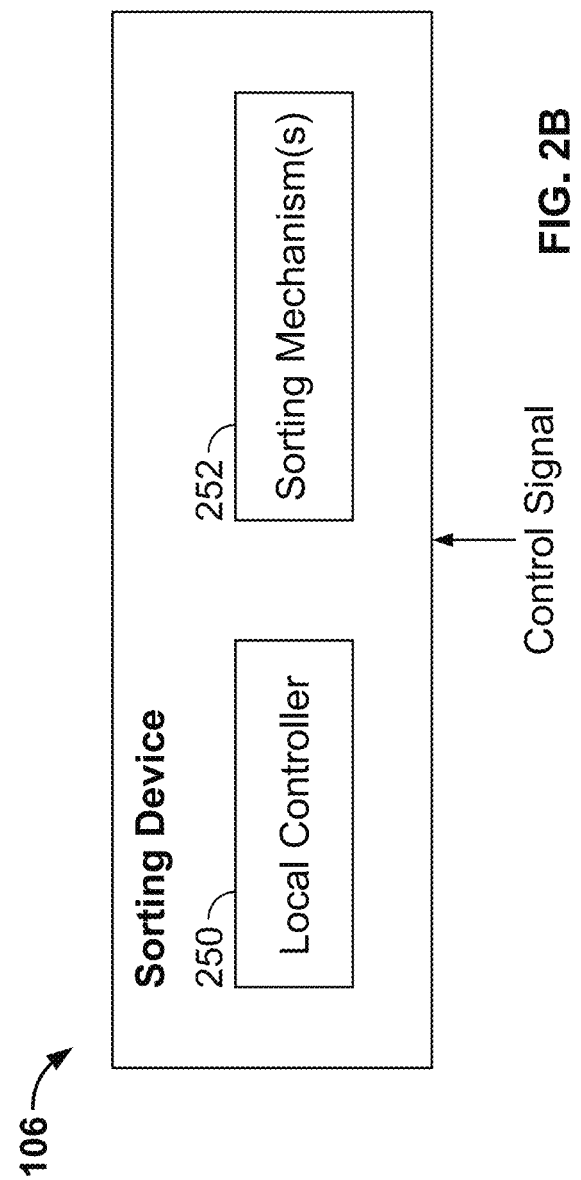

EFFICIENT MATERIAL RECOVERY FACILITY

CROSS REFERENCE TO OTHER APPLICATIONS

This application claims priority to U.S. Provisional Patent Application No. 63/087,045 entitled EFFICIENT MATERIAL RECOVERY FACILITY filed Oct. 2, 2020 which is incorporated herein by reference for all purposes.

BACKGROUND OF THE INVENTION

An issue with current material recovery facilities (MRFs) is that the machinery used and the operational paradigms they employ do not permit financially viable recirculation of material. This means that many facilities only capture ~50-80% of the total value of recyclables. Furthermore, a conventional material recovery facility is usually multi-leveled so that conveyors can be located on different levels to create height differentials between consecutive conveyors. Then, items can drop between conveyors that are placed on different levels and be sorted during the drop. The multiple level requirement of a conventional material recovery facility is both expensive and difficult to satisfy. As such, there is a need to efficiently recover valuable materials at a material recovery facility while also maintaining the purity level of recovered materials at the facility.

BRIEF DESCRIPTION OF THE DRAWINGS

Various embodiments of the invention are disclosed in the following detailed description and the accompanying drawings.

FIG. 2B is a diagram showing an example of a sorting device.

DETAILED DESCRIPTION

Figure 1:
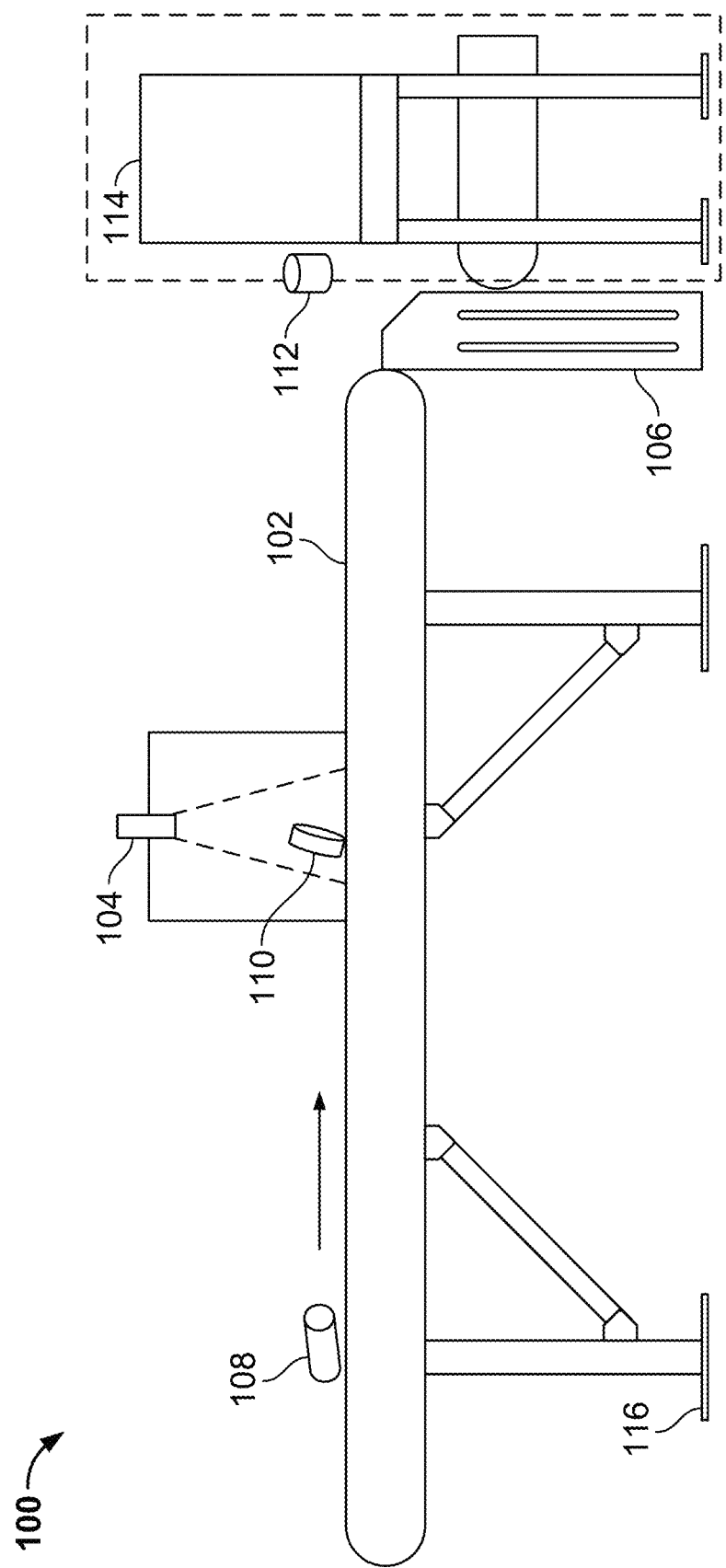
FIG. 1 is a diagram showing an example of a modular sorting unit.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of an efficient and reconfigurable material recovery facility are described herein. In various embodiments, each of one or more sorting lines of a material recovery facility may be implemented using a series of one or modular sorting units. In some embodiments, each modular sorting unit comprises at least a conveyor device, an object recognition device, a sorting control device, and a sorting device. Each modular sorting unit transports a stream of items on the conveyor device, receives sensed data (e.g., images) of the items on the conveyor device using the object recognition device, determines which items of the stream are target item(s) to be removed from the conveyor device using the sorting control device, and then removes the target item(s) from the material stream and into corresponding collection containers using the sorting device. In various embodiments, the sorting control device is configured to instruct the sorting device which target items to remove from the stream of items using one or more tunable sorting parameters. In various embodiments, in response to the instruction (e.g., from the sorting control device, a local processor, or a cloud server), the sorting device is configured to perform a sorting action on a target item to remove it from the stream of items. In some embodiments, detected events at the material recovery facility may cause the tunable sorting parameter(s) of the sorting control device of one or more modular sorting devices to be updated (e.g., to therefore modify the manner in which items are removed from the stream by the corresponding sorting devices).

As the need for serial sorting (e.g., removal) of items and/or parallel sorting (e.g., removal) of items changes or in response to other events, modular sorting units may be flexibly removed from or added to one or more parallel sorting lines within the material recovery facility. In various embodiments, each conveyor device in a series of conveyor devices within a sorting line is angled relative to the surface (e.g., the floor) on which the conveyor device is placed so as to propel the items that fall off the conveyor device along a ballistic trajectory. Target items will be removed from the stream mid-fall while non-target items will be allowed to land on the next conveyor device within the series of conveyor devices. As will be described in examples below, "target" items can be either materials that are desired to be recovered (e.g., recyclable materials) or materials that are not desired to be recovered (e.g., contaminant items), depending on the application of the sorting device. Angling each conveyor device will increase both the vertical and horizontal movements of the items in the stream from one conveyor device to the next and thereby permit more opportunities to remove the items in the junction between adjacent conveyor devices, while allowing the series of conveyor devices to be placed on the same plane. In various embodiments, items that are not removed from a stream of items by a first sorting device (e.g., that is part of a first modular sorting unit) are recirculated such that the items can be subjected to a sensor and potentially caused to be removed from the stream by a second sorting device (e.g., that is part of a second modular sorting unit) that is of the same sorting device type as the first sorting device. The recirculation of the same stream or set of items will enable a greater proportion of items that are desirable to be removed (e.g., due to their corresponding economic value) from the stream to be removed over multiple passes to ultimately increase the recovery rate of (e.g., valuable) items from the stream. Examples of materials to be sorted by a sorting line as described in various embodiments described herein include but are not limited to recycling, garbage, e-waste, demolition waste, packages, luggage, components on an assembly line, and produce.

FIG. 1 is a diagram showing an example of a modular sorting unit. Modular sorting unit 100 includes conveyor device 102, object recognition device 104 (which is connected to a sorting control device, which is not shown in FIG. 1), and sorting device 106. In some embodiments, object recognition device 104 is connected to a sorting control device either using a wired connection or a wireless connection. As shown in FIG. 1, conveyor device 102 transports a stream of items (such as items 108, 110, and 112) that are deposited onto it towards object recognition device 104 and sorting device 106. Object recognition device 104 may comprise an image capturing device (such as, for example, an infrared camera, visual spectrum camera, volumetric sensing, or some combination thereof) directed at conveyor device 102. For illustrative purposes, object recognition device 104 is assumed to be an image capturing device in various examples described herein. The sensed data (e.g., one or more images) of items is then input into the sorting control device, where the sorting control device is configured to identify zero or more target items within the image(s) captured by the object recognition device. In various embodiments, a "target" item that is to be identified by a particular sorting control device is an item that the particular sorting control device is configured to target for removal by a corresponding sorting device. As will be described in various examples herein, a target item is deposited into a corresponding collection container. In a first example, a target item can be a particular type of item that is made of a recyclable material and therefore has monetary value. In another example, a target item is a known type of contaminant that is desired to be isolated from other items of value. In some embodiments, the one or more target items are identified from the image(s) by the sorting control device using a trained machine learning model and/or other artificial intelligence that is configured to identify target items within the image(s). The sorting control device associated with object recognition device 104 that corresponds to sorting device 106 is configured to send messages to sorting device 106 to indicate when target items that are being transported across conveyor device 102 should be removed from the stream of materials by sorting device 106. As shown in the example of FIG. 1, in response to the instruction from the sorting control device, sorting device 106, which is located at the end of conveyor device 102, is configured to perform a sorting action that comprises deflecting/shooting target items after they fall off of conveyor device 102 into corresponding collection containers (such as collection container 114) or target conveyor device (s) (not shown). For example, if sorting device 106 comprises an array of air orifices, the sorting control device that is coupled to object recognition device 104 corresponding to sorting device 106 is configured to indicate to sorting device 106 at what time sorting device 106 should fire at least some of its air orifices, which should hit a target item within the stream of materials as the materials fall off of conveyor device 102. Those items (e.g., non-target items) that are not fired on by sorting device 106 may land on another conveyor device, for example. In the example configuration of FIG. 1, sorting device 106 sits at ground-level between conveyor device 102 and the next conveyor device (in the same sorting line), and sorting device 106 shoots air at and therefore deflects target items up into collection container 114.

Referring to FIG. 1, item 112 has just fallen off of conveyor device 102 and if sorting device 106 had been instructed by the sorting control device associated with object recognition device 104 to remove item 112 from the stream (e.g., because item 112 is a target item), then sorting device 106 would perform a sorting action that comprises shooting air or using a mechanical sorting mechanism to modify the ballistic trajectory of item 112 and cause it to be deposited into a corresponding collection container or a target conveyor. Otherwise, if sorting device 106 had not been instructed by the sorting control device associated with object recognition device 104 to remove item 112 from the stream (e.g., because item 112 is a non-target item), then sorting device 106 would not interact with item 112 (using air or a mechanical mechanism) and instead, allow item 112 to land onto a subsequent conveyor device (e.g., associated with an adjacent modular sorting unit).

While in the example of FIG. 1, sorting device 106 is shown to be at the end of conveyor device 102 and is configured to remove target items from the stream after the items fall off from conveyor device 102, in other examples, sorting device 106 may be situated to the side of conveyor device 102 and/or over conveyor device 102 so as to remove target items off of the conveyor belt of conveyor device 102. For example, to remove target items off of the conveyor belt of conveyor device 102, sorting device 106 may use suction gripping, vacuum, robotic arms, diverters, positive pressure airflows, gate or door mechanisms, rotating friction wheels, magnetic couplers, and/or a pushing mechanism. Sorting device 106 of modular sorting unit 100 is not limited to a particular sorting mechanism.

While not shown in FIG. 1, conveyor device 102 can be configured to be angled within a predetermined range of angles such that the transported items placed on conveyor device 102 will move further away from plane 116 as the items move along the conveyor belt of conveyor device 102. As will be described in further detail below, one reason to set the conveyor device at an angle (as opposed to being parallel to the surface (e.g., plane 116) on which the conveyor device is placed) is to increase the height (relative to the surface) and distance at which items drop/fall off the conveyor device and therefore provide more time in which the items can be removed from the stream of materials by a sorting device before the items fall onto a subsequent conveyor device.

A modular sorting unit such as modular sorting unit 100 can be produced in a cost-efficient manner at scale. Furthermore, modular sorting units within a material recovery facility can be interchangeable, which improves consistency and greater throughput at the facility.

As will be described in further detail below, a sorting line within a material recovery facility may be constructed using a series of one or more modular sorting units such as modular sorting unit 100 of FIG. 1. Moreover, multiple, parallel sorting lines within a material recovery facility can be implemented using modular sorting units such as modular sorting unit 100 to improve throughput at the facility through parallelization. Also, as will be described in further detail below, recirculation of a stream of items through two or more sorting devices (e.g., associated with two modular sorting units) of the same type (including the scenario of recirculating the stream of items through the same sorting device more than once), such that the same stream of items is subjected to multiple rounds of sorting, enables a greater chance that more valuable target items will be recovered from the stream over the multiple passes. For example, a valuable target item that is not recovered (e.g., removed from the stream) by a first sorting device can be recovered (e.g., removed from the stream) by a second sorting device.

A first benefit of a modular sorting unit such as modular sorting unit 100 is that it can easily be swapped out for another instance of the same modular sorting unit in the event that a first instance of the modular sorting unit needs to be repaired or updated. A second benefit of a modular sorting unit such as modular sorting unit 100 is that it can be flexibly added to or removed from a sorting line to respectively increase or decrease sorting capacity, as needed.

Figure 2A:
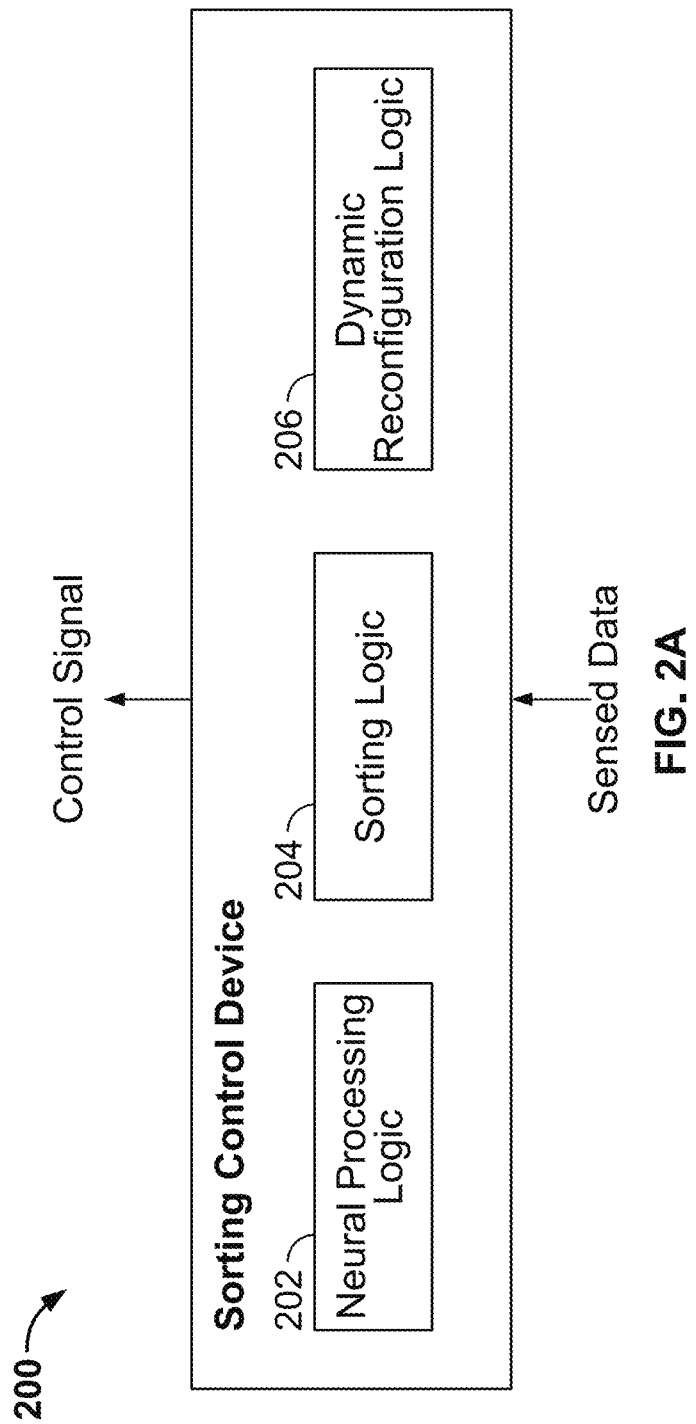
FIG. 2A is a diagram showing an example of a sorting control device.

FIG. 2A is a diagram showing an example of a sorting control device. In some embodiments, a sorting control device that is described to be connected to object recognition device 104 of FIG. 1 may be implemented using sorting control device 200 of FIG. 2A. In the example of FIG. 2A, sorting control device 200 includes neural processing logic 202, sorting logic 204, and dynamic reconfiguration logic 206. Each of neural processing logic 202, sorting logic 204, and dynamic reconfiguration logic 206 may either be implemented together on a common physical non-transient memory device, or on separate physical non-transient memory devices. In various embodiments, each of neural processing logic 202, sorting logic 204, and dynamic reconfiguration logic 206 may be implemented using one or more processors coupled to one or more memories that are programmed to execute code to carry out the functions of corresponding neural processing logic 202, sorting logic 204, and dynamic reconfiguration logic 206 described herein. In other embodiments, each of neural processing logic 202, sorting logic 204, and dynamic reconfiguration logic 206 may additionally, or alternately, be implemented using an application specific integrated circuit (ASIC) or field programmable gate array (FPGA) that has been adapted for machine learning.

Neural processing logic 202 is configured to receive raw sensed data (which in the case of a camera sensor may comprise image frames, for example) from an object recognition device. Neural processing logic 202 is configured to provide the received sensed data as input to one or more neural network and artificial intelligence techniques to locate and identify items appearing within the image frames that are potentially target items. As the term is used herein, an "image frame" is intended to refer to a collection or collected set of sensed data captured by an object recognition device that may be used to capture the spatial context of one or more potential items on a conveyor device along with characteristics about the items. A feed of image frames captured by an object recognition device is fed, for example, to a machine learning inference technique. The sequence of captured image frames may be processed by multiple processing layers, or neurons, to evaluate the correlation of specific features with features of items that it has previously learned. Alternative techniques to detect items within an image include Fully Convolutional Neural Network, Multibox, Region-based Fully Convolutional Networks (R-FCN), Faster R-CNN, and other techniques such as object detection, instance-aware segmentation, or semantic segmentation techniques.

Among the recognized items, neural processing logic 202 is configured to discriminate between target and non-target items based on a reconfigurable set of target item criteria. For example, the set of target item criteria can describe which types of items are considered to be "target items" (e.g., and therefore should be removed from the stream of items), while items that do not match the set of target item criteria are considered to be "non-target items" (e.g., and therefore should not be removed from the stream of items). For example, the set of target item criteria may describe a set of attribute information (e.g., target material type, and/or other target item shape/dimensions/color) for which a matching item is considered to be a "target item." For example, a matching item can be a single object (e.g., an aluminum can) or a cluster of objects (e.g., a cluster of grapes or a cluster of green beans). In various embodiments, the set of target item criteria that is configured for a particular sorting control device may be specifically configured for that particular sorting control device (associated with a first modular sorting unit) and may differ from the set of target item criteria that is configured for a different sorting control device (associated with a second, different modular sorting unit). Put another way, different sorting control devices may consider different types of items to be target items depending on their respective sets of target item criteria. In various embodiments, a sorting control device's set of target item criteria may be reconfigured/updated/modified to cause the sorting control device to identify different items to be "target items" over time. As will be described in further detail below, in response to detected events, tunable parameters associated with the material recovery facility, including a sorting control device's set of target item criteria, can be reconfigured (e.g., based on an instruction received from dynamic reconfiguration logic 206).

Based on the input sensed data (e.g., image frames) that is provided by an item recognition device, neural processing logic 202 is configured to determine information related to target items and non-target items that are being transported by the conveyor device. In some embodiments, the information related to target items that are determined by neural processing logic 202 includes attribute information. For example, attribute information includes one or more of, but not limited to, the following: a material type associated with each item, an approximate mass associated with each item, an associated geometry associated with each item, dimensions (e.g., height and width/area) associated with each item, a designated deposit (e.g., collection container) location associated with each item, and an orientation associated with each item. In some embodiments, the information related to items that are determined by neural processing logic 202 includes location information. For example, location information includes one or more coordinates at which each item was located in the image frame(s) that were input into neural processing logic 202. In a specific example, the location information of each item is the coordinate of the centroid of the item. Neural processing logic 202 is configured to send the attribute information and location information of target items and non-target items to sorting logic 204.

Sorting logic 204 is configured to determine which target items to instruct to a sorting device to remove from a stream of items based on the information (e.g., attribute information and location information) associated with target items and non-target items that it receives from neural processing logic 202. In some embodiments, sorting logic 204 is configured to determine, for each target item, whether the removal of that target item from the stream of items should be suppressed (e.g., avoided) using a reconfigurable set of suppression criteria. Certain sorting mechanics of removing a target item from a stream include physically deflecting (e.g., using a vacuum, a positive airflow, or a physical mechanism) the target item into a collection container. However, it is possible that the physical deflection aimed at the target item could inadvertently also deflect a non-target item into the collection container intended for the target item. The result of inadvertently deflecting a non-target item into the collection container is that the purity level of items collected in one or more collection container(s) would decrease, which is undesirable. For example, the "purity level" corresponding to items deposited into one or more collection containers can be defined as either 1) the total number of collected target items over the total number of all items collected at the collection container(s) or 2) the total weight of collected target items over the total weight of all items collected at the collection container(s). Typically, the greater the purity level of items collected at the collection container(s), the greater the (e.g., economic) value that is associated with the collected items. As such, it is undesirable to allow neighboring non-target items to be inadvertently deposited into a collection container when a sorting device fires on a target item because doing so will lower the purity level associated with the items collected at the collection container. For example, the set of suppression criteria describes the conditions for when a sorting device should not fire on a target item (to reduce the risk that the non-target item also inadvertently becomes deposited into a collection container). In a specific example, the set of suppression criteria may describe that if a non-target item is located within a predetermined distance from a target item and that the size of the non-target item is greater than a predetermined size, then the sorting device should not be instructed to remove the target item (to reduce the risk that the non-target item becomes deposited into a collection container) (i.e., the removal of that target item should be suppressed). In some embodiments, sorting logic 204 is configured to determine which target items should be removed and which should not be removed by a sorting device using the set of suppression criteria. In some embodiments, sorting logic 204 is configured to store data to indicate the target items for which removal (e.g., via the performance of a sorting action) was determined by sorting logic 204 to not be performed by the sorting device.

For the target items that sorting logic 204 determines should be removed from the stream of materials, in some embodiments, sorting logic 204 is configured to determine the manner in which those target items are to be removed using a reconfigurable set of removal parameters. For example, the set of removal parameters describes, but is not limited to, one or more of the following: which collection containers to deposit target items of different material types and how much force/pressure to use to remove the target items from the stream and into corresponding collection containers. Sorting logic 204 is configured to send control signals to at least one corresponding sorting device to instruct that at least one sorting device which/when/how to perform sorting actions to remove target items from the stream of materials. As will be described in further detail below, in response to detected events, tunable parameters associated with the material recovery facility, including a set of suppression criteria and a set of removal parameters, can be reconfigured (e.g., based on an instruction received from dynamic reconfiguration logic 206).

Dynamic reconfiguration logic 206 is configured to dynamically reconfigure tunable parameters with respect to the material recovery facility in response to detected events. In various embodiments, various parameters with respect to at least a portion of the material recovery facility, including, for example, one or more modular sorting units, an interference removal mechanism, an item adhesion mechanism, and a recirculation configuration associated with one or more sorting lines, can be updated and modified to respond to/accommodate detected events associated with the material recovery facility. Specific examples of tunable parameters that can be reconfigured in response to a detected event include, but are not limited to: a set of target item criteria associated with a modular sorting unit, a set of suppression criteria associated with a modular sorting unit, a set of removal parameters associated with a modular sorting unit, a speed of a conveyor belt of a conveyor device, an angle $\alpha$ t which a conveyor device (of a modular sorting unit) is set, whether and/or how to activate an interference removal mechanism along a sorting line within the material recovery facility, whether and/or how to adjust an adhesion mechanism that causes items to better adhere to the conveyor devices, the locations of collection containers corresponding to different target items, whether and/or how to reconfigure the recirculation of the stream of materials through the material recovery facility, and/or the force of vacuum or other airflow-based techniques for removing a target item from the stream of materials.

A first example of a detected event is a detected recovery level associated with a target material type. For example, a "recovery level" associated with a target material type can be determined as either 1) the total number of collected items of the target material type over the total number of items of all materials types collected at the collection container(s) or 2) the total weight of collected target items of the target material type over the total weight of items of all materials types collected at the collection container(s). For example, if the recovery level of a certain target material type falls below a desired threshold, then dynamic reconfiguration logic 206 can dynamically reconfigure the set of target item criteria corresponding to one or more modular sorting units that previously did not target that particular target material type to additionally target the particular target material type (in an effort to increase that material type's recovery level). A second example of a detected event is a sensed clog/jam within a sorting line (e.g., a bottleneck of items that is preventing the stream of materials from moving smoothly through a sorting line). For example, one or more sensors placed along different conveyor devices within a sorting line can detect whether a clog/jam has occurred and in response, dynamic reconfiguration logic 206 can activate an interference removal device within the sorting line and/or change the speed of the conveyor devices within the sorting line in an effort to remove the clog/jam. A third example of a detected event is a determination that items are moving relative to the conveyor belts (based on sensors that detect movements of the items) of the conveyor devices (which is undesirable because such movement would cause the determined locations of the items on the conveyor devices to be less accurate). In response to the detected movement of items relative to the conveyor belts, dynamic reconfiguration logic 206 can be configured to activate an adhesion mechanism (e.g., such as air lamination and/or electric adhesion) in the material recovery facility to cause the items to remain more static/adhere better to the conveyor devices. The example detected events described above are merely examples and in practice, any type of detected event can trigger dynamic reconfiguration logic 206 to reconfigure any parameter associated with its own modular sorting unit, send an instruction to another modular sorting unit to trigger a reconfiguration of a parameter associated with the other modular sorting unit, and/or send an instruction to another entity within the material recovery facility to trigger a reconfiguration of a parameter associated with the facility. Other examples of detected events that could trigger dynamic reconfiguration of tunable parameters include: a user input, an indication received from a third-party server, and a detected purity level associated with a target material type.

In some embodiments, dynamic reconfiguration logic 206 is configured to programmatically reconfigure the tunable parameters of the material recovery facility in response to detected events based on a set of reconfiguration rules that describe how specific parameters should be reconfigured in response to specific events. For example, the reconfiguration rules may be generated based at least in part on historical testing (e.g., empirical testing or AB testing) of different combinations of parameters (e.g., different physical parameters such as different speeds of conveyor devices, different angles of conveyor devices, and/or different force that is used by sorting devices) that lead to more desirable sorting results. In some embodiments, dynamic reconfiguration logic 206 is configured to programmatically reconfigure the tunable parameters of the material recovery facility in response to detected events based on artificial intelligence (e.g., such as a trained machine learning model that receives a detected event as an input and then outputs updated tunable parameter values to optimize the sorting results of the material recovery facility).

In some embodiments, sorting control device 200 of FIG. 2A may be connected to one or more object recognition devices and/or be configured to send instructions (e.g., control signals) to one or more sorting devices. For example, sorting control device 200 of FIG. 2A is connected to one or more object recognition devices (e.g., across corresponding one or more modular sorting units) associated with a single sorting line so that sorting control device 200 is able to be informed by a holistic view of a stream of items as it travels through the entire sorting line. Furthermore, in that same example, sorting control device 200 is configured to send instructions (e.g., control signals) to one or more sorting devices (e.g., across corresponding one or more modular sorting units) based on the sensed data that sorting control device 200 receives from the one or more object recognition devices. In that example where sorting control device 200 is connected to potentially multiple object recognition devices and can send instructions to potentially multiple sorting devices within a sorting line, sorting control device 200 can send determinations that it makes with respect to items sensed in one portion of a sorting line to a sorting device that is located later within the sorting line. For example, sorting control device 200 can determine that a target item is of a material that is to be discarded (e.g., an item of trash that should not be deflected into a collection container) based on sensed data received from an object recognition device located at one point in a sorting line and can send instructions to a sorting device that is located later in the sorting line and that is configured to target items of trash to cause that sorting device to remove the item of trash when that item can be targeted by that particular sorting device. In another example, sorting control device 200 can determine that performing a sorting action on a target item is to be suppressed by a first sorting device but can instruct a second sorting device to target that particular item when that item can be targeted by the second sorting device. In another example, a sorting control device such as sorting control device 200 is configured to communicate to another sorting control device within a single sorting line with a determination that it has made with respect to a particular item (e.g., whether that item should be targeted by a sorting device associated with the recipient sorting control device).

FIG. 2B is a diagram showing an example of a sorting device. In some embodiments, sorting device 106 of FIG. 1 may be implemented using the example sorting device of FIG. 2B. In the example of FIG. 2B, the example sorting device includes local controller 250 and sorting mechanism(s) 252. In various embodiments, local controller 250 may be implemented using one or more processors or a microcontroller. Sorting mechanism(s) 252 may be implemented using one or more types of mechanisms that can be used to perform a sorting action on a target item to remove the target item out of a stream of items. In a first example, sorting mechanism(s) 252 comprise one or more arrays of air orifices that are connected to one or more sources of pressurized air and as such, sorting mechanism(s) 252 perform a sorting action by shooting air towards a target item to deflect the target item into a collection container. In a second example, sorting mechanism(s) 252 comprise a suction cup that is actuated by a robot system and as such, sorting mechanism(s) 252 perform a sorting action by dropping down onto a target item and picking it off a conveyor device and then dropping the item into a collection container. In a third example, sorting mechanism(s) 252 comprise one or more air vents that are connected to a vacuum source and as such, sorting mechanism(s) 252 perform a sorting action by vacuuming a target item off a conveyor device and through a tube at the end of which the target item will drop into a collection container. In a fourth example, sorting mechanism(s) 252 comprise one or more actuated pushing mechanisms and as such, sorting mechanism(s) 252 perform a sorting action by physically contacting (striking) the target item to cause the target item to be deposited into a collection container.

Local controller 250 is configured to receive control signals from an internal processor or from an external/ remote processor (e.g., associated with one or more sorting control devices or a cloud server) and to interpret the received control signals to cause sorting mechanism(s) 252 to perform the instructed sorting actions on the appropriate target items. For example, local controller 250 can determine when to cause sorting mechanism(s) 252 to fire, which subset of sorting mechanism(s) 252 to fire, with what force sorting mechanism(s) 252 should fire with, and/or for how long sorting mechanism(s) 252 should fire continuously or intermittently. In the specific example in which sorting mechanism(s) 252 comprise an array of air orifices that are connected to pressured air sources, local controller 250 is configured to cause at least a subset of the air orifices of the array to shoot air at a particular time so that the airflow can deflect a target item into a collection container (e.g., just after that target item falls off a conveyor device).

Figure 3:
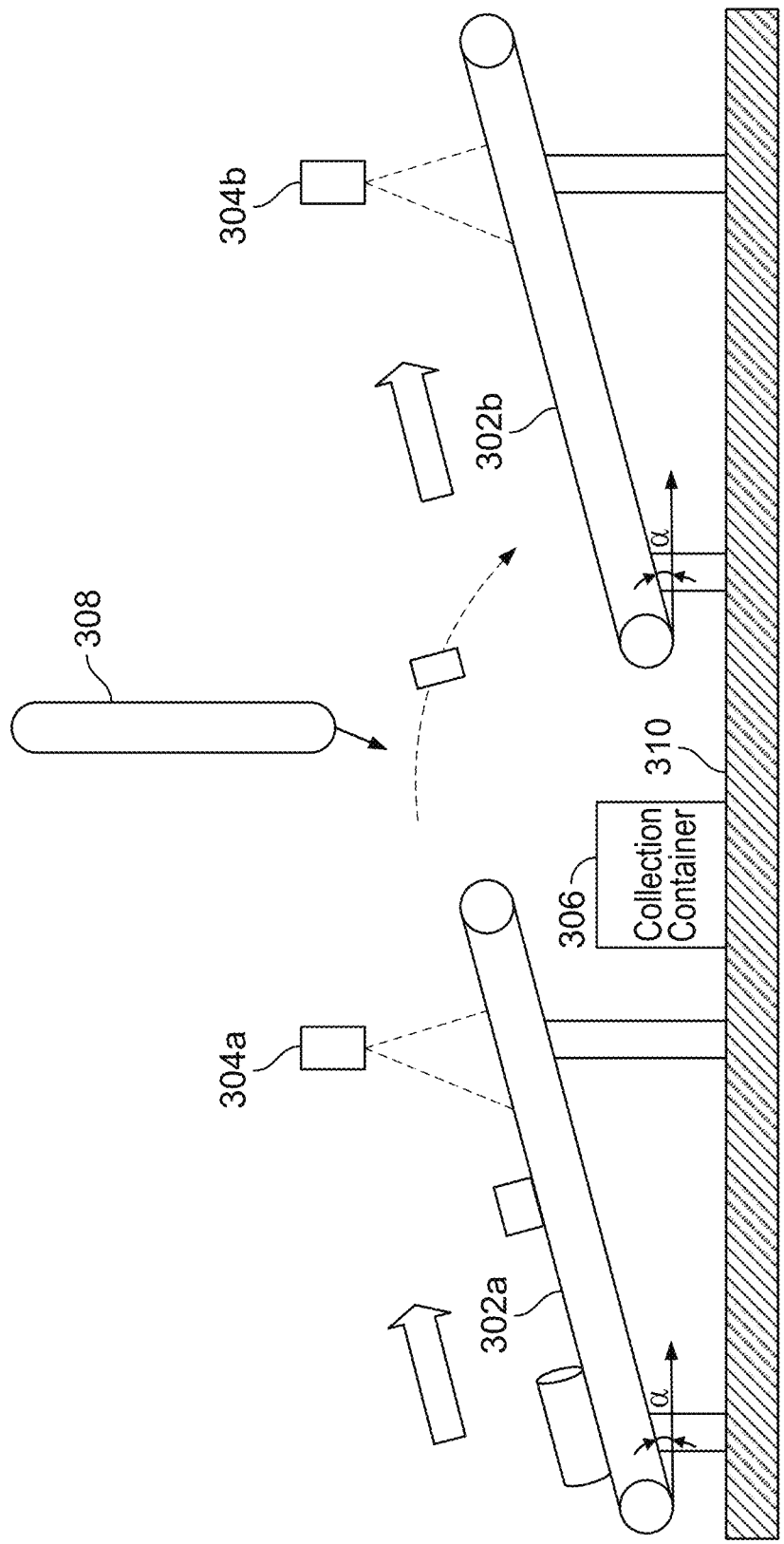
FIG. 3 is a diagram showing an example of a series of angled conveyor devices in a sorting line within a material recovery facility.

FIG. 3 is a diagram showing an example of a series of angled conveyor devices in a sorting line within a material recovery facility. In the example of FIG. 3, conveyor devices 302a and 302b are placed one after another within a sorting line within a material recovery facility. Above conveyor devices 302a and 302b are respective object recognition devices 304a and 304b, which capture sensed data associated with items that are transported across the respective conveyor devices. In particular, object recognition device 304a is configured to capture sensed data with respect to items that are transported across conveyor device 302a and object recognition device 304a is also configured to send the sensed data to a corresponding sorting control device (not shown). The sorting control device (which may be implemented using the example sorting control device of FIG. 2A) is configured to determine which items that are transported by conveyor device 302a are target items and then instruct sorting device 308 (which may be implemented using the example sorting device of FIG. 2B) to remove those target items out of the stream of materials after the target item(s) have fallen off of conveyor device 302a. Put another way, sorting device 308 is instructed to remove target items that fall off of conveyor device 302a in the junction or gap in between conveyor device 302a and conveyor device 302b. For example, sorting device 308 may remove target items in the junction or gap in between conveyor device 302a and conveyor device 302b by shooting air at the target items and causing the target items to be deflected into a corresponding collection container, collection container 306. For example, conveyor device 302a, object recognition device 304a and a corresponding sorting control device, and sorting device 308 may be considered one modular sorting unit (such as modular sorting unit 100 of FIG. 1).

Conventionally, each conveyor device in a series of conveyor devices in a material recovery facility is each set parallel/flat relative to the plane on which it is set but consecutive conveyor devices are placed on different planes (e.g., different levels/floors) of a building so as to create a large height differential in between consecutive conveyor devices such that items could be removed from the stream during the fall between the conveyor devices. In contrast, as shown in FIG. 3, consecutive conveyor devices 302a and 302b are each placed at an angle, a, and also placed on the same plane, plane 310. Due to the angle (a) of each of conveyor devices 302a and 302b, items that land near one end of the conveyor devices are transported upwards away from plane 310 as they move across the conveyor devices such that the items fall off from the other end of the conveyor devices at a greater height than the height at which they had landed on the conveyor devices. The result of setting conveyor devices 302a and 302b at angle α is that the angle causes a height differential to be created between the end of conveyor device 302a from which items fall and the end of conveyor device 302b at which the fallen items land, but allows conveyor devices 302a and 302b (as well other conveyor devices within the same sorting line) to remain on the same plane (e.g., floor, surface, level). For example, angle α can be set to be a degree within the range of 5 to 15 degrees. In some embodiments, the lower ends of each consecutive conveyor device in a series of conveyor devices can but does not need to be exactly the same height. In some embodiments, consecutive conveyor devices in a series of conveyor devices can but does not need to be set at exactly the same angle. Put another way, using a series of angled conveyor devices to transport items to be sorted will create height differentials between consecutive conveyor devices and therefore opportunities to sort target items (by removing the target items out of the material stream during the junction between consecutive conveyor devices) but allow the conveyor devices to remain on the same plane. Setting consecutive devices of a sorting line on the same plane is both more space efficient and cost efficient than the conventional technique of placing consecutive conveyor devices across different planes. Moreover, not only does the height differential between consecutive, angled conveyor devices create opportunity to divert target items into collection containers, it also helps to reduce jams that could otherwise be caused by a short gap between flat conveyor devices. Furthermore, angling consecutive conveyor devices also creates more space, for example, under the raised ends of the conveyor devices to place collection containers and/or equipment, such as shown in the example of FIG. 4, below.

Figure 4:
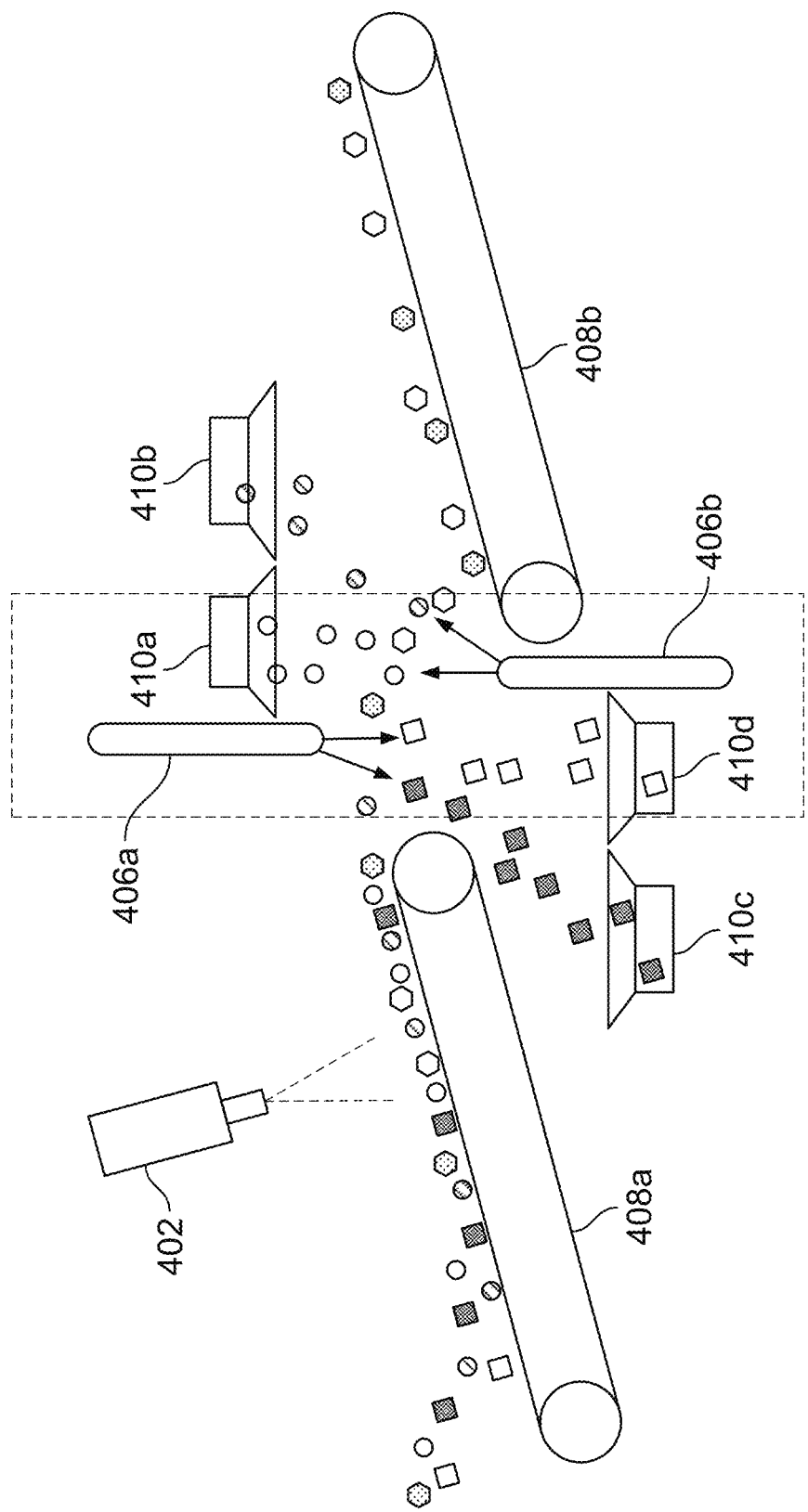
FIG. 4 is a diagram showing two example conveyor devices and two sorting devices that are located at the junction between the two conveyor devices.

FIG. 4 is a diagram showing two example conveyor devices and two sorting devices that are located at the junction between the two conveyor devices. In the example of FIG. 4, items are transported along conveyor device 408a towards sorting devices 406a and 406b (e.g., each of which can be implemented using the example sorting device of FIG. 2B). As the items are traveling across conveyor device 408a, object recognition device 402 is configured to capture one or more images of the items and a corresponding sorting control device (e.g., which can be implemented using the example sorting control device of FIG. 2A) is configured to identify target items and also (e.g., nearby) non-target items based on the captured image(s). The sorting control device is configured to send the determined target item and non-target item information to sorting devices 406a and 406b. Sorting devices 406a and 406b are then configured to fire on the target items as the target items are in the air in between conveyor device 408a and conveyor device 408b. As shown in the example, sorting devices 406a and 406b are each configured to shoot in two directions, where each direction is associated with a particular material type or grouping of materials (e.g., a blend of 40% of Material Type A and 60% of Material Type B). The fired-on target items are then deflected into their respective collection containers 410a, 410b, 410c, and 410d, where each collection container is configured to store target items of a different type of material. Note that collection containers 410c and 410d are efficiently placed, at least in part, below the raised end of conveyor device 408a.

Figure 5:
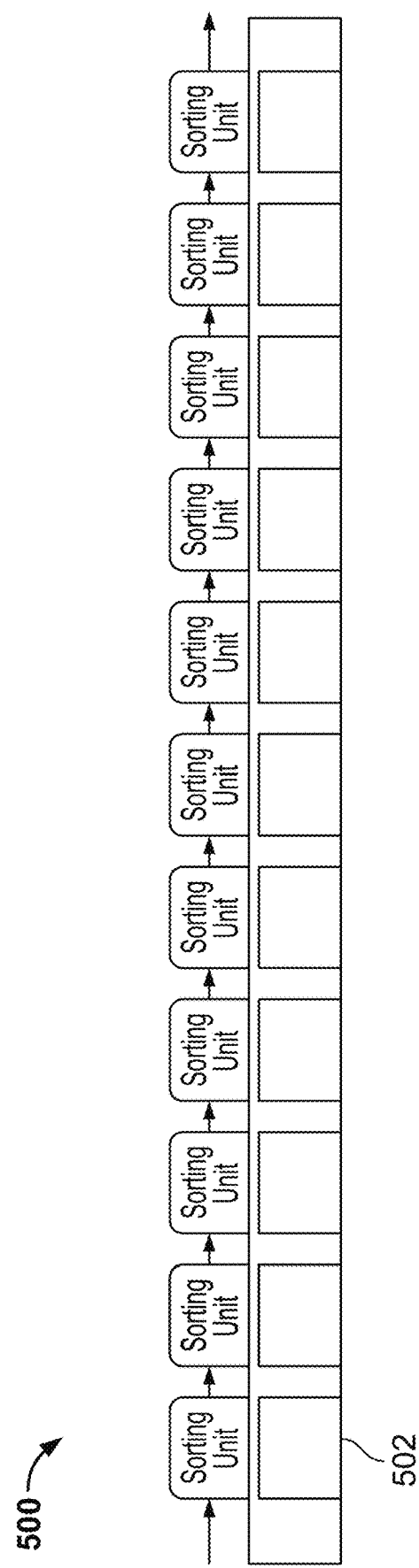
FIG. 5 is a diagram showing a series of sorting units in a sorting line of a material recovery facility and where the conveyor devices are located on the same plane.

FIG. 5 is a diagram showing a series of sorting units in a sorting line of a material recovery facility and where the conveyor devices are located on the same plane. Sorting line 500 includes a series of sorting units on a plane, where each sorting unit may include an angled conveyor device (e.g., such as conveyor device 102 of FIG. 1, conveyor devices 302a and 302b of FIG. 3, or conveyor devices 408a and 408b of FIG. 4) with a respective sorting device at the junction/gap between consecutive conveyor devices. Due to the series of conveyor devices being placed on the same plane, the series of conveyor devices can even be placed on top of large collection containers such as 502 in an example configuration.

Figure 6:
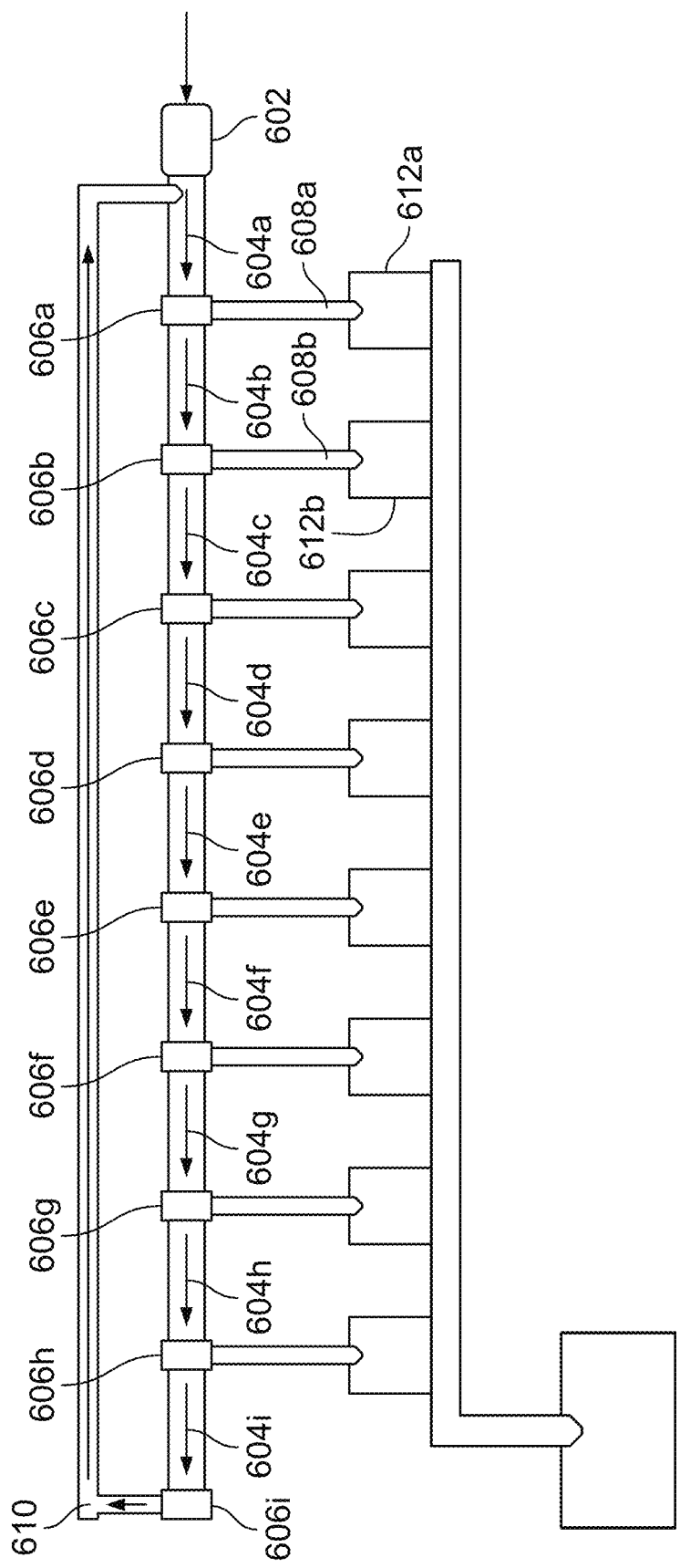
FIG. 6 is a diagram showing an embodiment of an efficient material recovery facility with a single sorting line.

FIG. 6 is a diagram showing an embodiment of an efficient material recovery facility with a single sorting line. In the example shown in FIG. 6, the material recovery facility includes a bird's eye view of one sorting line that includes a series of conveyor devices, where each conveyor device is adjacent to a sorting device. Specifically, the example material recovery facility in FIG. 6 includes a sorting line that includes nine conveyor devices (which are associated with reference numbers 604a through 604i in FIG. 6), each of which is followed by a corresponding sorting device (which are associated with reference numbers 606a through 606i in the FIG. 6). However, in actual practice, a sorting line can have any number of conveyor devices and corresponding sorting devices. Furthermore, in actual practice, a sorting device may be placed over a conveyor device, next to a conveyor device, or at the end of a conveyor device.

Examples of materials to be sorted by a sorting line as described in various embodiments described herein include but are not limited to recycling, garbage, e-waste, demolition waste, packages, luggage, components on an assembly line, and produce. Materials to be sorted by the sorting line of FIG. 6 are transported (e.g., via a conveyor belt) onto the first conveyor device, conveyor device 604a from location 602. As shown in the example of FIG. 6, prior to being placed onto conveyor device 604a, the materials may be preprocessed (e.g., such as by being broken down by a bale breaker), presorted, with iron-based materials separated by ferrous separation, and finer items screened. The materials remaining from the preprocessing are transported (e.g., via a conveyor belt) in a stream onto one end of conveyor device 604a. The materials are then transported across conveyor device 604a by a conveyor belt and propelled off the other end of conveyor device 604a. As the materials are transported across conveyor device 604a, an object recognition device (not shown in FIG. 6) is configured to generate one or more images of the materials in the conveyor belt. In various embodiments, the object recognition device is coupled to and/or includes a sorting control device that is configured to identify zero or more target items (i.e., items of a target material type) within the image(s) captured by the object recognition device. As described above, for example, "target items" have value and are desired to be collected, which is known as a "positive sort." For example, target items can be a particular type of item that is made of a recyclable material. In another example, "target items" may also be viewed as undesirable materials to sort out of the stream known as "negative sort." In some embodiments, the one or more target items are identified by the sorting control device using a trained machine learning model and/or other artificial intelligence that is configured to identify target items within the image(s). The sorting control device associated with the object recognition device that corresponds to sorting device 606a is configured to send messages to sorting device 606a to indicate when target items that are being transported across conveyor device 604a should be sorted (e.g., fired on) by sorting device 606a and therefore removed from the stream of materials. For example, if sorting device 606a comprises an array of air orifices, the sorting control device that is coupled to the object recognition device corresponding to sorting device 606a is configured to indicate to sorting device 606a at what time sorting device 606a should fire at least some of its air orifices, which should hit a target item within the stream of materials as the materials fall off of conveyor device 604a and onto the next conveyor device in the series, conveyor device 604b. In the example in FIG. 6, sorting device 606a is located at the junction/gap between conveyor device 604a and conveyor device 604b and is configured to remove the target item(s) that have been identified by the corresponding object recognition device from the stream of materials that falls off (due to the high speed of the conveyor belt of conveyor device 604a) from conveyor device 604a. By way of example, sorting device 606a can remove target item(s) from the stream of materials that falls off of conveyor device 604a by shooting air at the target items such that the target items are shot/deflected onto target conveyor 608a. For example, sorting device 606a may be an array or a plane of air orifices and a specified subset of the air orifices will fire on a target item for a specified length of time as the target item falls from conveyor device 604a en route to conveyor device 604b. Target conveyor 608a is configured to then transport the target items into a corresponding bunker of sorted materials, collection container 612a. Because the target items of the materials stream that fall off from conveyor device 604a are intercepted by sorting device 606a before they can reach conveyor device 604b, only the items that are not intercepted by sorting device 606a land on conveyor device 604b.

In another example (not shown in FIG. 6), alternative to being located at the end of a conveyor device or in the gap between two conveyor devices, a sorting device (such as one or more of sorting devices 606a, 606b, 606c, 606d, 606e, 606f, 606g, 606h, and 606i) may be located over/above some portion of a conveyor device (such as one or more of conveyor devices 604a, 604b, 604c, 604d, 604e, 604f, 604g, 604h, and 604i). In some embodiments, where a sorting device is located over/above a conveyor device, the sorting device may be configured to suction target items as they are being transported across the conveyor device. In a first example, where the sorting device comprises an array of vacuum tubes positioned over the conveyor device, the suctioned target item is then passed through an outlet of a vacuum tube and onto a target conveyor or into a collection container. In a second example, where the sorting devices comprise a robotic arm that actuates a suction gripper, the suctioned target item can be dropped by the robotic arm onto a target conveyor or into a collection container.

In yet another example (not shown in FIG. 6), alternative to being located at the end of a conveyor device or in the gap between two conveyor devices, a sorting device (such as one or more of sorting devices 606a, 606b, 606c, 606d, 606e, 606f, 606g, 606h, and 606imay be located on the side of or next to some portion of a conveyor device (such as one or more of conveyor devices 604a, 604b, 604c, 604d, 604e, 604f, 604g, 604h, and 604i). In some embodiments, where a sorting device is located on the side of or next to a conveyor device, the sorting device may be configured to push target items as they are being transported across the conveyor device. The target item can then be pushed onto a target conveyor or into a collection mechanism.

The conveyor belt of conveyor device 604b will then transport the remaining materials that land on it towards conveyor device 604c. Similar to what had occurred on conveyor device 604a, the materials on conveyor device 604b are scanned by an object recognition device (not shown in FIG. 6), which is coupled to a corresponding sorting control device that identifies target items within the materials and instructs sorting device 606b to remove those target items from the stream of materials that fall from conveyor device 604b and onto conveyor device 604c. Similar to sorting device 606a, sorting device 606b is configured to remove the target items identified by its corresponding sorting control device in the junction/gap between conveyor device 604b and conveyor device 604c. The target items that are removed by sorting device 606b en route from conveyor device 604b to conveyor device 604c are deposited onto target conveyor 608b, which is configured to transport the target items into collection container 612b.

The remaining materials that land on conveyor device 604c will be serially processed through the remaining conveyor devices 604c, 604d, 604e, 604f, 604g, 604h, and 604i, which are interleaved between sorting devices 606c, 606d, 606e, 606f, 606g, 606h, and 606i of the sorting line of FIG. 6, similarly as to how they were processed by conveyor device 604a and 604b and by interleaved sorting devices 606a and 606b. By removing at least some target items from the original set/stream of materials at each junction between adjacent conveyor devices using the corresponding interleaved sorting device, the same set of materials will be serially processed by (recirculated through) multiple instances of sorting devices across one sorting line. The result is that target items that are missed by (passed on or otherwise not recovered by) one sorting device may be targeted by another sorting device. By examining the same set of materials more than once by one or more sorting devices, the recovery of target items from the set of materials improves significantly while the purity among the recovered items is maintained. The recovered items that are deposited by target conveyors into collection containers (e.g., such as collection container 612a) can be bundled together for purchasers of such materials (e.g., parties that recycle materials).

In some embodiments, the example sorting line shown in FIG. 6 can be implemented using a series of modular sorting units (e.g., such as modular sorting unit 100 of FIG. 1), where each modular sorting unit includes a conveyor device, an object recognition device connected to a sorting control device, and a sorting device.

In some embodiments, each of sorting devices 606a, 606b, 606c, 606d, 606e, 606f, 606g, 606h, and 606i of the example sorting line of FIG. 6 is of the same type of sorting device. In some embodiments, sorting devices 606a, 606b, 606c, 606d, 606e, 606f, 606g, 606h, and 606i of the example sorting line of FIG. 6 include two or more types of sorting devices. For example, different types of sorting devices may remove a target item from a stream of materials at a junction between adjacent conveyor devices or positioned above/over the conveyor devices using a different mechanism. Some examples of such mechanisms that can be used by sorting devices to remove target items from a stream of materials include shooting with air, suctioning, pushing, and grabbing. As mentioned before, one specific type of sorting device comprises an array or a plane of air orifices of which a subset of air orifices is triggered to shoot air on target items to remove them from the stream of materials that are falling off of one conveyor device and onto another.

In some embodiments, each of sorting devices 606a, 606b, 606c, 606d, 606e, 606f, 606g, 606h, and 606i of the example sorting line of FIG. 6 can be dynamically reconfigured to perform sorting according to a set of tunable parameters. For example, the set of tunable parameters that can be dynamically tuned for a sorting device includes a specified one or more types of materials to select (e.g., according to a set of target item criteria), a specified threshold for target item identification, and a threshold for suppression (e.g., when not to act on removing a target item due to a detected contaminant being nearby) (e.g., according to a set of suppression criteria). The set of parameters that a sorting device uses to perform sorting can be reconfigured manually or automatically, in real-time, in response to a detected event. For example, the detected event may be the recovery rate or the purity rate of the recovered materials being less than a predetermined threshold. Different sorting devices within the same sorting line may each be configured with different parameters, for example. In a specific example, sorting devices 606a, 606b, 606c, 606d, 606e, and 606f are initially configured to select Material Type A and sorting devices 606g, 606h, and 606i are initially configured to select Material Type B. However, after determining that the recovery rate of Material Type B is desired to be increased, sorting devices 606a, 606b, 606c, 606d, 606e, and 606f can be reconfigured to also each target Material Type B.

In some embodiments, multiple object recognition devices and associated sorting control devices corresponding to sorting devices along the same sorting line can communicate with each other in a holistic and networked manner to improve the recipient sorting devices' sorting ability. For example, a sorting control device that is associated with an object recognition device that corresponds to a sorting device that processes materials earlier in the sorting line can determine that a target item was not removed from the stream of materials (e.g., because a non-target item had been located too close) and can send a message to another sorting control device associated with an object recognition device that corresponds to a sorting device that processes materials later in the same sorting line to indicate that the later sorting device should target a specific target item. Similarly, for example, a sorting control device associated with an object recognition device that corresponds to a sorting device that processes materials later in the sorting line can determine that a target item was not removed from the stream of materials (e.g., because a non-target item had been located too close) and can send a message to another sorting control device associated with an object recognition device that corresponds to a sorting device that processes materials earlier in the same sorting line to indicate that the earlier sorting device should target a specific target item upon recirculation of the same set of materials through the sorting line. As such, multiple sorting devices and their corresponding object recognition devices and associated sorting control devices can work in concert to improve sorting across one or more sorting lines. In contrast, a conventional sorting device type performs sorting in isolation of other conventional sorting devices.

In some embodiments, a sorting device, such as the last sorting device in a sorting line (sorting device 606i of the example sorting line of FIG. 6), can be configured differently than the other sorting devices along the same sorting line. One reason that this last sorting device can be configured differently is to facilitate the selective recirculation of materials through the sorting line. In some embodiments, unlike the other pairs of sorting devices and their corresponding object recognition and sorting control devices in a sorting line, where each pair is configured to identify only one type of material, the last set of object recognition device, sorting control device, and sorting device in the sorting line is configured to identify more than one type of material. For example, the target items that are identified by the last sorting device are deposited onto a recirculation conveyor (as opposed to a collection container) that brings the selected materials back to the first or another earlier sorting device of the same or a different sorting line so that the items can be processed/recirculated through a sorting line once again. In another example, the target items that are not identified as target items by the last sorting device are fired on to prevent those items from being deposited onto a recirculation conveyor and the identified target items are not fired on and therefore end up being deposited onto the recirculation conveyor. Put another way, the last sorting device is configured to separate all materials that are desired to be recovered into a recirculation conveyor and the other materials that are not desired to be recovered into a temporary storage (e.g., a residue storage) so that the undesired materials will not be recirculated through a sorting line. As shown in the example sorting line of FIG. 6, the remaining materials that were not previously targeted by any of sorting devices 606a, 606b, 606c, 606d, 606e, 606f, 606g, and 606h are transported towards sorting device 606i. As the stream of materials fall off of the last conveyor device of the sorting line (conveyor device 604i), based on the messages that sorting device 606i receives from its corresponding object recognition and sorting control devices, sorting device 606i is, for example, configured to select target items of all material types that are selected by any of the preceding sorting devices within the sorting line and to also not suppress selection of any target items (e.g., to increase the probability that all candidate recoverable items are to be recirculated through the sorting line, even if the selection of a target item will inadvertently cause a non-target item to also be recirculated). The items that are selected are transported by recirculation conveyor 610 back to the beginning of the same sorting line. The items that are not selected by the last sorting device, sorting device 606i, are deemed to be of low value (e.g., they are non-target that should not be recovered) and will therefore be moved into a residue disposal and not be recirculated through the sorting line. While the example of FIG. 6 shows recirculation conveyor 610 transporting the selected recirculated items back to be processed by the same sorting line, in other examples that are described in further detail below, items that are selected to be recirculated from one sorting line may be recirculated through the same or a different sorting line.

In some embodiments, the speed at which the respective conveyor belt rotates in each of conveyor devices 604a, 604b, 604c, 604d, 604e, 604f, 604g, 604h, and 604i can be dynamically reconfigured. Changing the speed at which a conveyor belt of a conveyor device rotates would change the trajectory at which items are projected/propelled/thrown off of the conveyor device, loosen up jammed items, and also affect the way that a sorting device is configured to select items that fall off of the conveyor device. Changing the speed at which a conveyor belt of a conveyor device rotates would also cause the items to land differently at the destination conveyor device. For example, increasing the speed of a conveyor belt of a conveyor device would cause the materials that are projected from it to be more dispersed (e.g., spread farther apart from each other) at the destination conveyor device.

In some embodiments, each of conveyor devices 604a, 604b, 604c, 604d, 604e, 604f, 604g, 604h, and 604i is angled such that each conveyor device lifts items from a given height and then drops them back to substantially the same height (e.g., onto one end of the next conveyor device in the series of conveyor devices in the same sorting line), while a sorting device selects falling items at the junction between two adjacent conveyor devices. As mentioned above, by angling each conveyor device in a sorting line, each conveyor device can project/propel/waterfall items onto the next conveyor device on the same plane of a building. As such, all the conveyor devices of a single sorting line can be located on the same plane of a building, instead of across multiple planes that would otherwise be used to create height differentials between adjacent flat conveyor devices.

In some embodiments, some conveyor devices are angled to lower items, while a sorting device selects objects moving on the lowering conveyor and raises them to a higher conveyor for transport to a bin. In these embodiments, sorting devices may be positioned along the lowering conveyor as long as the sorting device has the capability to raise an item to a conveyor at a higher level. In some embodiments, conveyor devices can be run in parallel at the same or slightly different levels with gates between conveyor devices. In these embodiments, a sorting device positioned at a lateral gate can manipulate a target item through the gate (laterally to the conveyor direction of travel), causing the target item to switch to the new conveyor device.

In some embodiments, each of sorting devices 606a, 606b, 606c, 606d, 606e, 606f, 606g, 606h, and 606i of the example sorting line of FIG. 6 is detachable from the sorting line. The advantage of detaching a sorting device from a sorting line is that sorting devices may often need updating, maintenance, repairing, or cleaning, so it is advantageous to be able to easily remove a sorting device from a sorting line and also insert a (e.g., new, repaired, cleaned, updated) sorting device into the sorting line (e.g., to replace a removed sorting device). As will be described in further detail below, in some embodiments, a detachable sorting device can be moved (e.g., slid, rolled) on and off of guided tracks on the ground (e.g., in between two adjacent conveyor devices in a sorting line) to ensure that the sorting device is always accurately positioned within a sorting line.

While not shown in the example of FIG. 6, a sorting line may include other components such as, for example, a shredder, a tool that separates clusters of items, a magnet, a screen, and/or any type of sortation equipment that either modifies or leverages the physical properties of material (and potentially separates it) to make the downstream sensing/sorting more efficient.

As mentioned above, while the example sorting line in FIG. 6 has nine conveyor devices and nine sorting devices (e.g., associated with nine corresponding modular sorting units), in actual practice, a sorting line can be modularly configured to include any number of conveyor devices and corresponding sorting devices (e.g., any number of modular sorting units) to perform serialized sorting with recirculation back through the same or a different sorting line. A sorting line with recirculation capabilities can be as simple as one modular sorting unit (e.g., such as modular sorting unit 100 of FIG. 1, which includes a single conveyor device, a single pair of an object recognition device and a sorting control device, a corresponding sorting device) and a recirculation conveyor that carries items that fall off of one end of the conveyor device but that do not get removed from the stream and deposits those remaining items at the other end of the same conveyor device so that the items can be sorted by the object recognition device and the sorting device over multiple passes.

Also, as will be described in further detail below, in some embodiments, multiple sorting lines can be used to process materials in parallel. In the multiple sorting line facility example, the sorting lines may fan out from a common material input source and/or fan back into a common recirculation line.

In some embodiments, the same set of materials can be recirculated through a set of sorting lines until a set of stop criteria is reached. Examples of the set of stop criteria include a predetermined number of recirculation passes having been performed, the remaining set of materials falling between a certain (e.g., weight) threshold, and a predetermined recovery rate having been met.

Based on various embodiments described herein, sets of conveyor devices, object recognition devices with corresponding sorting control devices, and sorting devices (e.g., associated with corresponding modular sorting units) can be modularly added and removed from one or more sorting lines to accommodate different needs and spaces of a material recovery facility. Entire sorting lines may also be modularly added and removed from a material recovery facility. Furthermore, the sorting devices can be adaptively and dynamically reconfigured in real-time to change their sorting parameters. The recirculation mechanism can be used to improve the number of times that the same set of materials is reviewed by object recognition and sorting control devices and potentially selected by sorting devices to improve recovery rate and the purity level of the recovered materials.

While not shown in FIG. 6, in some embodiments, the material recovery facility can be configured to sort through a heterogeneous stream of materials. In some embodiments, the "heterogenous stream of materials" refers to a mix of object types of items that are included within the same stream. An example heterogenous stream of materials may include one or more of the following: mixed recyclables, packages, luggage, or partially processed waste streams. Where such a heterogeneous stream of materials is processed by a sorting device of a sorting unit, the sorting device can be caused by a sorting control device to target multiple object types (e.g., where each object type is associated with its corresponding set of physical characteristics) and cause a target item to be removed from the stream and also directed to another sorting unit (or sorting line) that is configured to recover target items of that item's object type. Put another way, instead of a removing a target item from a heterogeneous stream of materials and depositing it into a collection container, in some embodiments, a sorting device of one sorting unit can change the trajectory of the target item (e.g., by shooting air at the target item) such that the target item lands on the conveyor device of another sorting unit, where the sorting device of this second sorting unit is configured to specifically recover target items of that object type. For example, a heterogenous stream of materials includes an item of Object Type A, an item of Object Type B, and an item of Object Type C. The sorting device of the sorting unit that receives these three items is configured to target items of Object Types A, B, and C. The sorting device will then cause the item of Object Type A to be deposited on the conveyor device of a sorting unit whose sorting device is configured to target (e.g., deposit into a collection container) at least items of Object Type A, cause the item of Object Type B to be deposited on the conveyor device of a sorting unit whose sorting device is configured to target (e.g., deposit into a collection container) at least items of Object Type B, and cause the item of Object Type C to be deposited on the conveyor device of a sorting unit whose sorting device is configured to target (e.g., deposit into a collection container) at least items of Object Type C.

Figure 7:
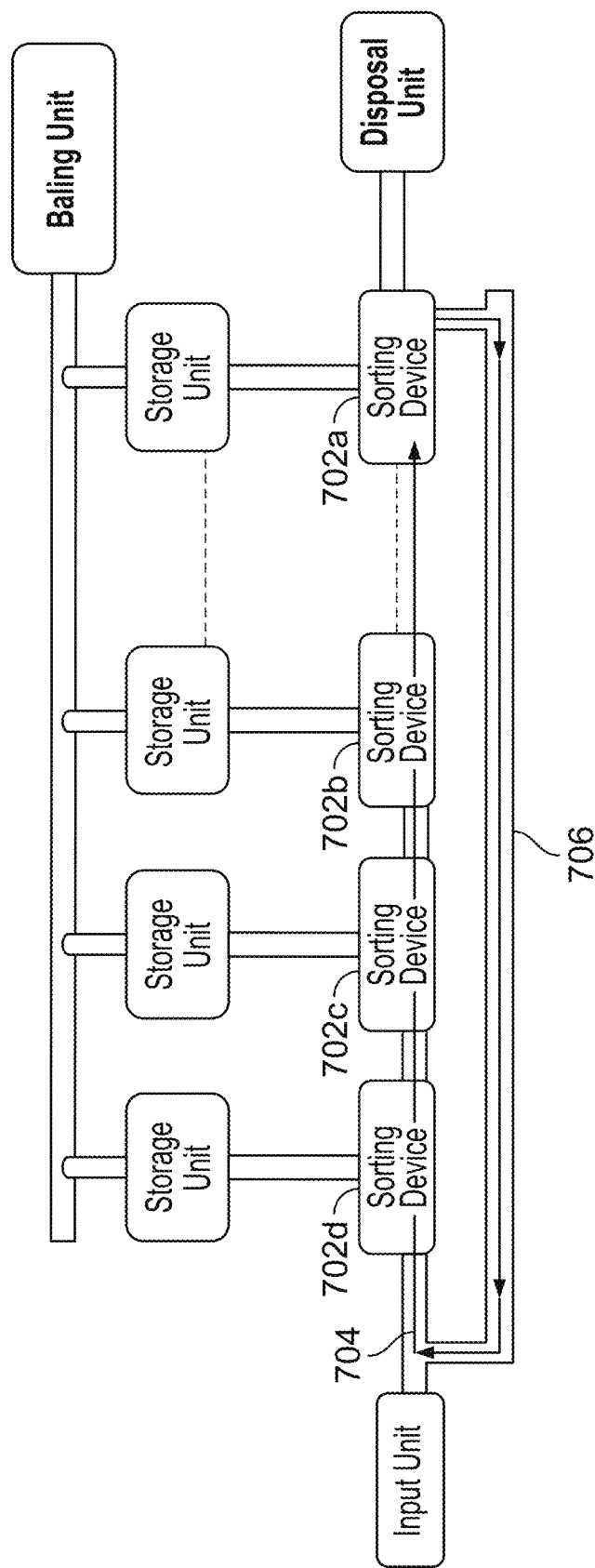
FIG. 7 is a diagram showing an example of recirculating materials through a single sorting line.

FIG. 7 is a diagram showing an example of recirculating materials through a single sorting line. Line 704 shows the direction of the flow of materials through a series of conveyor devices and interleaved sorting devices (sorting devices 702a, 702b, 702c, and 702d) that form a single sorting line. The (subset of) materials that have been selected for recirculation by the last sorting device of the sorting line, Sorting Device 702a, are returned to the beginning of the sorting line via recirculation conveyor 706.

While the example of FIG. 7 shows that the items that are remaining at the end of the sorting line are recirculated (via a recirculation conveyor, air ducting, or other method of conveyance) back to the beginning of the same sorting line, in other example, the items can be recirculated (e.g., via recirculation conveyors, air ducting, or other method of conveyance) to a specific portion of the same sorting line or of a different sorting line. For example, if it is determined that the remaining items include more of Material Type B, then the items can be recirculated to a sorting device that is configured to target Material Type B.

Figure 8:
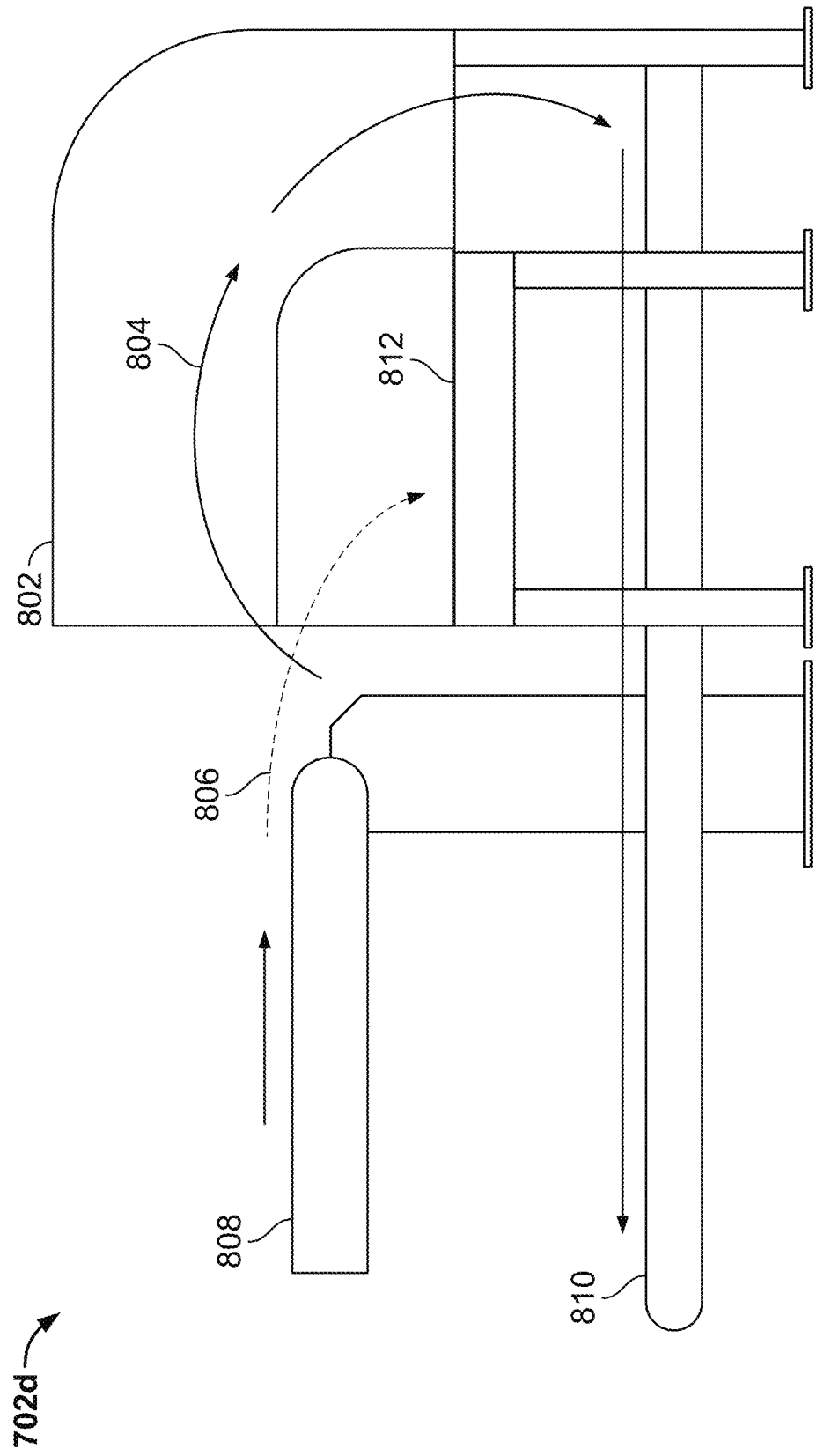
FIG. 8 is a diagram showing an example of a last sorting device in a sorting line that is configured to select materials for recirculation.

FIG. 8 is a diagram showing an example of a last sorting device in a sorting line that is configured to select materials for recirculation. In some embodiments, sorting device 606i of FIG. 6 and sorting device 702d of FIG. 7, which are each the last sorting device in their respective example sorting lines, may be implemented using the example sorting device described in FIG. 8. As described above, in some embodiments, the last sorting device in a sorting line is configured to separate items that are desired to be recirculated through at least one sorting line from items that are not desired to be recirculated. As shown in the example of FIG. 8, items are transported by conveyor device 808 towards sorting device 802. In the example of FIG. 8, sorting device 802 comprises an array of air orifices (not shown). Sorting device 802 is configured to shoot air (downwards, in this specific example) on all items of material types that are determined to be recovered. Due to the high speed at which the conveyor belt of conveyor device 808 is configured to move, without intervention of sorting device 802, all items that fall off of conveyor device 808 are propelled along trajectory 804 and onto recirculation conveyor 810. For example, recirculation conveyor 810 is configured to carry the items back to the beginning of the same or a different sorting line so that the items can again be processed by the object recognition devices, sorting control devices, and sorting devices of a sorting line. However, sorting device 802 is configured to receive messages from a corresponding sorting control device that is coupled to an object recognition device (not shown) and to fire on the target items (e.g., the target items in this specific example may be of any material type that is not desired to be recovered) that have been identified by the corresponding object recognition device. As such, sorting device 802 is configured to shoot air downwards at the selected items as they fall off conveyor device 808, thereby changing their trajectory from 804 to trajectory 806 and therefore causing the selected items to drop onto temporary storage conveyor 812 that will carry those items into a temporary storage. In one example application of a material sorting facility for processing garbage and recyclables, sorting device 802 is configured to fire on target items comprising undesired items (e.g., garbage items) to cause them to be conveyed into the temporary storage (e.g., a residue disposal) and not fire on non-target desired items (e.g., recyclable items) so that the desired recyclable items can be recirculated to and processed again by a sorting line to sort the different types of recyclable items into their corresponding material type collection containers.

Figure 9:
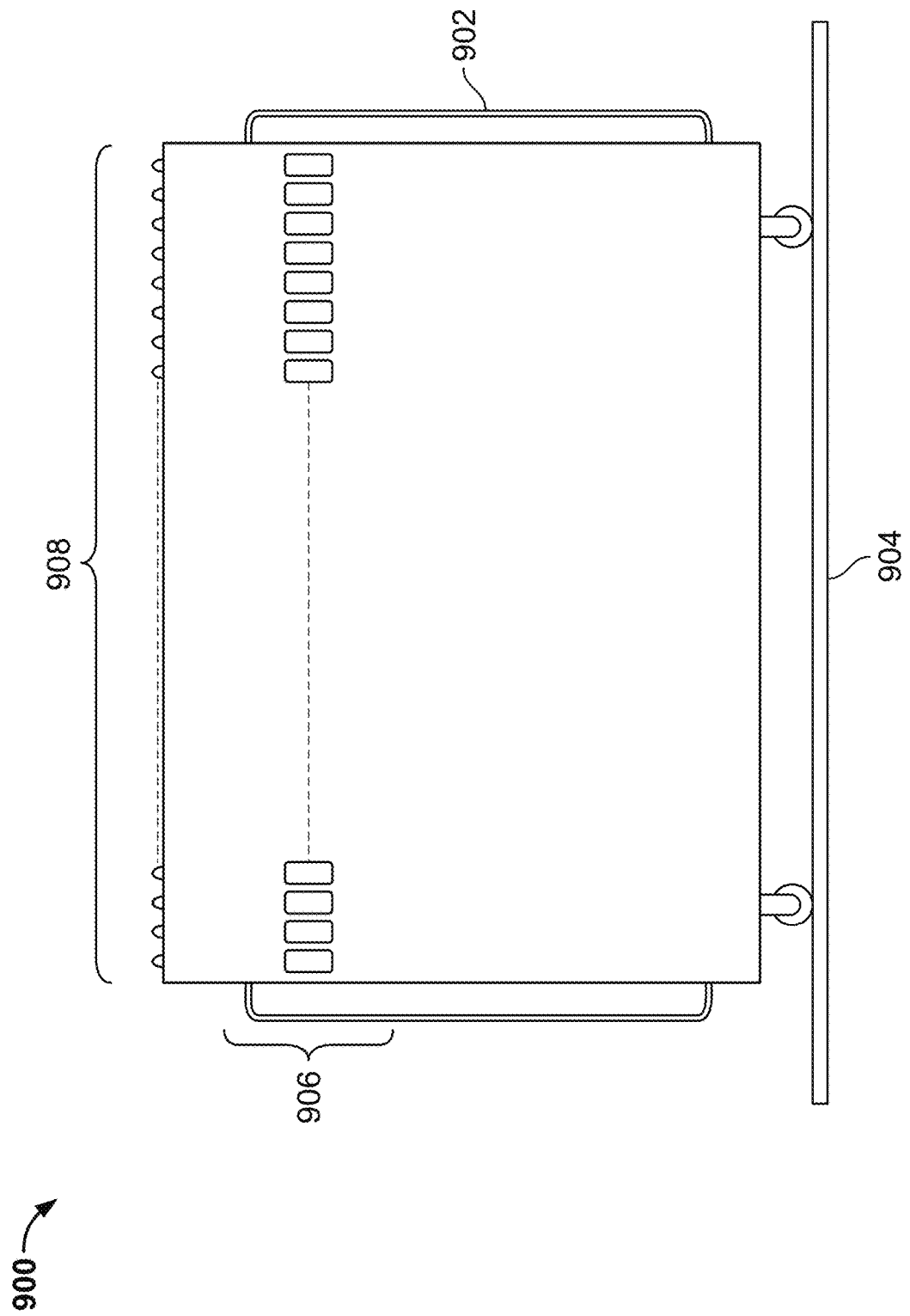
FIG. 9 is a diagram showing an example of a detachable sorting device.

FIG. 9 is a diagram showing an example of a detachable sorting device. In some embodiments, one or more of sorting devices 606a, 606b, 606c, 606d, 606e, 606f, 606g, 606h, and 606i of FIG. 6 can be implemented with sorting device 900 of FIG. 9. In some embodiments, one or more of sorting devices 702a, 702b, 702c, and 702d of FIG. 7 can be implemented with sorting device 900 of FIG. 9.

In the example of FIG. 9, detachable sorting device 900 comprises manifolds 906 that hold sets of valves that will be attached via pneumatic tubes (not shown in FIG. 9) to sorting mechanisms that comprise an array of air orifices 908. Different sections of array of air orifices 908 will shoot air at target items as they fall off a conveyor device, depending on where the target items were on the conveyor belt and the estimated dimensions (e.g., length and width) of the target items, to change the trajectory of the target items such that they fall onto a target conveyor that will carry them into a corresponding collection container for storing the particular material type of the target items.

As shown in FIG. 9, sorting device 900 can be detachable from a sorting line because sorting device 900 is not physically attached to the other modular components (e.g., conveyor device) of a sorting line. Instead, sorting device 900 is configured to roll onto tracks 904 that are attached to the floor of the facility. As such, sorting device 900 can be easily taken out of a sorting line (e.g., for maintenance and repair) and then reinserted into the correct position within the sorting line by simply being rolled back onto tracks 904, which ensures that the sorting device will always be placed in the same position (to avoid needing to recalibrate the position of the sorting device relative to that of the conveyor device, etc.). Handles 902 located on the side of sorting device 900 make it easier for a user to pull and push the sorting device in and out of the sorting line.

Alternative to the detachable sorting device that can be rolled onto tracks that is shown in FIG. 9, in some embodiments, the sorting device can be removable from a sorting line but not attached to the ground. A specific example of a removable sorting device is one that can be attached and/or fastened onto a conveyor device. That way, the removable sorting device can still be unfastened from the conveyor device for repair or maintenance but also can be added back into the sorting line in a consistent position.

Any type of detachable sorting device such as the examples described herein would enable the use of interchangeable sorting devices, which would help prevent any down time in the material recovery facility when a sorting device is to be repaired or maintained.

Figure 10:
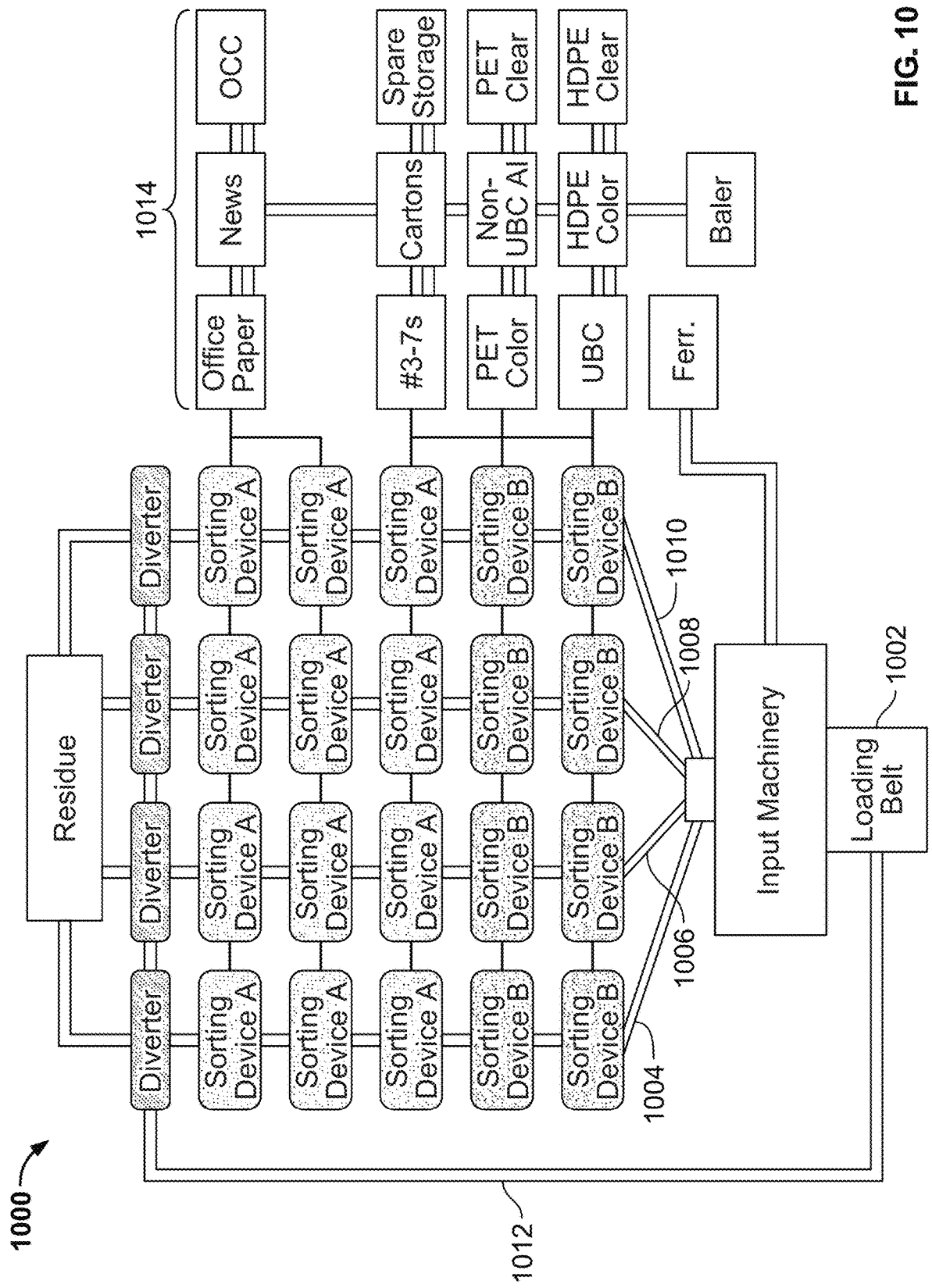
FIG. 10 is a diagram showing an embodiment of an efficient material recovery facility with multiple, parallel sorting lines.

FIG. 10 is a diagram showing an embodiment of an efficient material recovery facility with multiple, parallel sorting lines. The example material recovery facility shown in FIG. 10 may be implemented for sorting recyclable materials. In the example of FIG. 10, example material recovery facility 1000 includes a bird's eye view of four parallel sorting lines (sorting lines 1004, 1006, 1008, and 1010) that fan out from a common source, loading belt 1002, and also fan back into a common recirculation conveyor, recirculation conveyor 1012. Adding parallel sorting lines to a material recovery facility will significantly increase recovery throughput through parallelized sorting activity. Furthermore, each of the sorting lines can be implemented using a series of modular sorting units (e.g., such as modular sorting unit 100 of FIG. 1), which can reduce costs and improve consistency of material sortation. In the specific example that is shown in FIG. 10, prior to being transported and spread across sorting lines 1004, 1006, 1008, and 1010, the stream of materials can be preprocessed by common preprocessing components like a shredder (e.g., to reduce the size of larger items) and a magnet (e.g., to screen out ferrous materials from entering the sorting lines). The input machinery equipment used for preprocessing that is shown in the example of FIG. 10 is merely an example and in practice, any type of preprocessing equipment (e.g., magnet, shredder, screeners, etc.) and in any sequence can be used to preprocess the stream of materials at any point within or in advance of a sorting line. Each of sorting lines 1004, 1006, 1008, and 1010 includes a respective series of conveyor devices that is each associated with a corresponding sorting device. Each sorting device is coupled to/in communication with a pair of an object recognition device and a sorting control device (not shown in FIG. 10) that is configured to scan and analyze the items that are being moved towards it by a conveyor device. In some embodiments, each of sorting lines 1004, 1006, 1008, and 1010 may be implemented similarly to the example sorting line of FIG. 6 and the example sorting line of FIG. 7. In the example of FIG. 10, each of the sorting devices is labeled as "Sorting Device A" or "Sorting Device B." Each such sorting device may refer to an instance of a type of a sorting device with a different sorting mechanism (e.g., air orifice, suction, pusher, robotic arm, diverters, or otherwise) and/or an instance of a sorting device with a particular set of configured parameters (e.g., suppression thresholds, target material type(s), and target item identification thresholds). In this example, each instance of "Sorting Device A" or "Sorting Device B" in each of sorting lines 1004, 1006, 1008, and 1010 is configured to identify and fire on target items of a particular type of material. The fired-on target items are removed from the stream of materials that is being transported through each sorting line and are then deposited onto a target conveyor (e.g., that is moving in a direction that is orthogonal to a direction in which materials are moving along the sorting lines) or through transfer tubes. Each target conveyor or transfer tube is configured to transport deposited target items to one or more bunkers for storing recovered materials of a particular material type. The specific example types of materials that are being sorted in FIG. 10 are related to recyclable materials. As shown in the example of FIG. 10, the target items that are deposited onto the target conveyor (s) that run through one row of "Sorting Device B" sorting devices (across sorting lines 1004, 1006, 1008, and 1010) are transported to those of collection containers 1014 for storing "UBC" type materials, "HDPE Color" type materials, and "HDPE Clear" type materials. The target items that are deposited onto the target conveyor(s) that run through another row of "Sorting Device B" sorting devices (across sorting lines 1004, 1006, 1008, and 1010) are transported to those of collection containers 1014 for storing "PET Color" type materials, "Non-UBC Al" type materials, and "PET Clear" type materials. The target items that are deposited onto the target conveyor(s) that run through a first row of "Sorting Device A" sorting devices (across sorting lines 1004, 1006, 1008, and 1010) are transported to those of collection containers 1014 for storing "#3-7s" type materials, "Cartons" type materials, and "Spare storage" type materials. The target items that are deposited onto the target conveyor(s) that run through a second and a third row of "Sorting Device A" sorting devices (across sorting lines 1004, 1006, 1008, and 1010) are transported to those of collection containers 1014 for storing "Office paper" type materials, "News" type materials, and "OCC" type materials. For example, the row of "Diverter" sorting devices (across sorting lines 1004, 1006, 1008, and 1010) may each be configured to select items (that had not been removed from the stream by a previous sorting device) from their respective sorting lines to be deposited onto recirculation conveyor 1012, which is configured to transport the selected items back to the source of sorting lines 1004, 1006, 1008, and 1010, loading belt 1002. The recirculated materials are then processed through all the shared components of the facility (e.g., the shredder, magnet) before being dispersed among the four sorting lines, sorting lines 1004, 1006, 1008, and 1010, for a subsequent pass through those sorting lines. Those items that are not selected by "Diverter" sorting devices for recirculation are deposited into the "Residue" storage. As mentioned above, the same stream of materials may be recirculated through the sorting lines 1004, 1006, 1008, and 1010 until a set of recirculation criteria is met. While the specific example types of materials that are being sorted in FIG. 10 are related to recyclable materials, the example sorting lines shown in FIG. 10 can be used to sort through any type of material.

Figure 11:
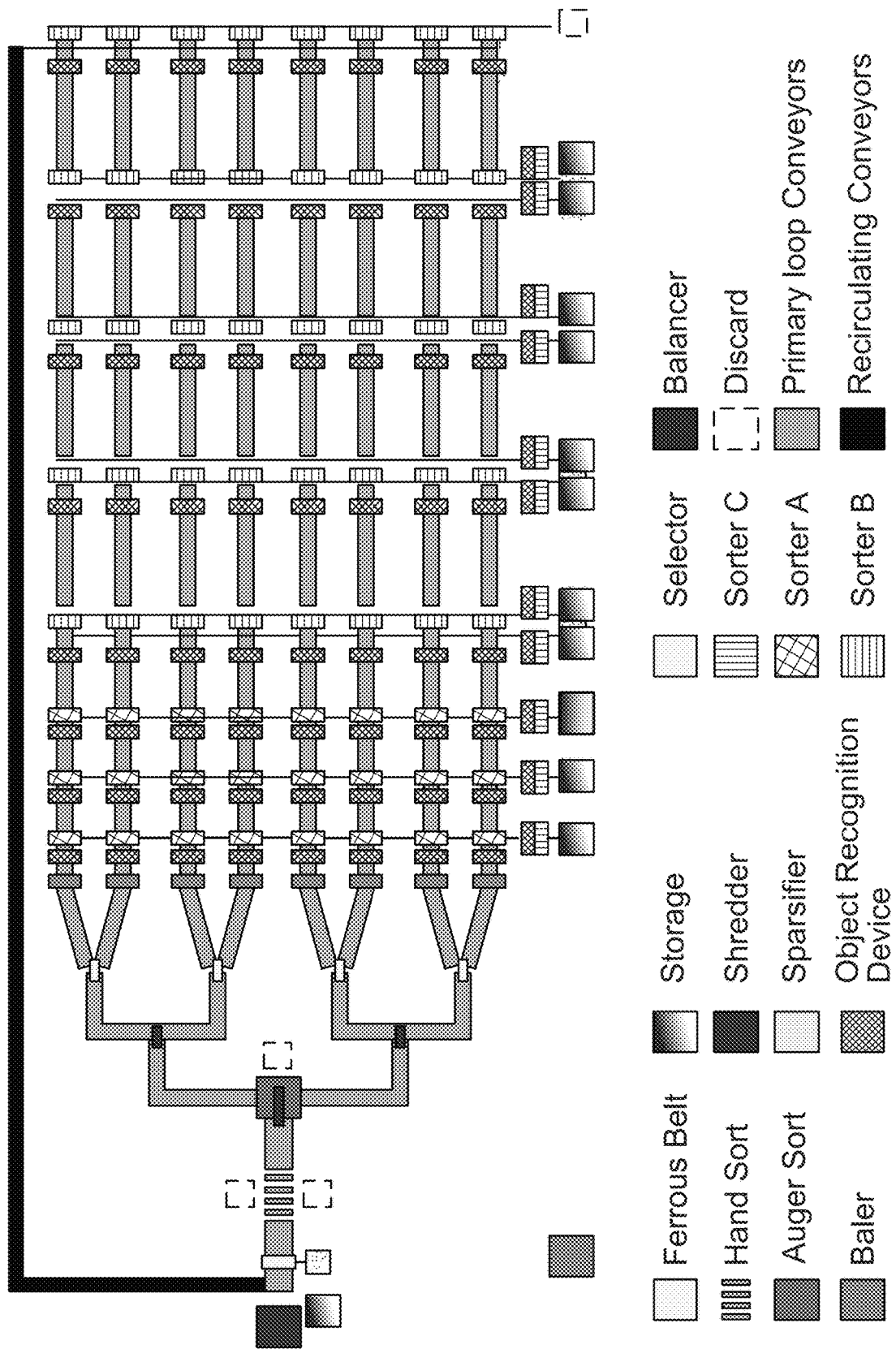
FIG. 11 is a diagram showing another embodiment of an efficient material recovery facility with multiple, parallel sorting lines.

FIG. 11 is a diagram showing another embodiment of an efficient material recovery facility with multiple, parallel sorting lines. In the example of FIG. 11, the example material recovery facility includes a bird's eye view of eight parallel sorting lines that fan out from a common source and also fan back into common recirculation conveyors. Each of the sorting lines can be implemented using a series of modular sorting units (e.g., such as modular sorting unit 100 of FIG. 1), which can reduce costs and improve consistency of material sortation. Prior to being transported and spread across the eight sorting lines, the set of materials is preprocessed by common preprocessing components like a shredder (e.g., to reduce the size of larger items), a ferrous belt (e.g., to screen out ferrous materials from entering the sorting lines), a hand sorting station, and an augur sort. The particular equipment used for preprocessing that is shown in the example of FIG. 11 is merely an example in practice and any type of preprocessing equipment (e.g., magnet, shredder, screeners, etc.) and in any sequence can be used to preprocess the stream of materials at any point within or in advance of a sorting line. The preprocessed set of materials is then distributed by the motion of the conveyor belts, devices that separate items ("sparsifiers"), and the balancers across the eight sorting lines. Upon being distributed to a particular sorting line, the items are spread further apart from each other using a tool that mechanically separates materials from each other. Each of the eight sorting lines includes a respective series of conveyor devices (labeled as "Primary loop conveyors" in FIG. 11) that are each followed by a corresponding sorting device that is coupled to an object recognition device and a corresponding sorting control device. In the example of FIG. 11, each object recognition device is labeled as "Object Recognition Device." Each instance of "Object Recognition Device" in FIG. 11 may, for example, include a corresponding sorting control device. Each sorting line includes two example types of sorting devices respectively referred to as "Sorter A" and "Sorter B." Similar as described above, materials that are processed by a particular sorting line are transported from one conveyor device to the next in the sorting line. Before the materials fall off a conveyor device, they are scanned by the Object Recognition Device" and corresponding sorting control device that are located over the conveyor device. That "Object Recognition Device" and corresponding sorting control device then identify to its corresponding sorting device (a "Sorter A" or a "Sorter B" system), which items are target items. Once the target items reach a corresponding sorting range of a sorting device, the corresponding "Sorter A" or "Sorter B" sorting device will fire on the target items such that they are deposited onto a target conveyor (or transfer tube) that transports the target items to corresponding storage containers. In the example of FIG. 11, a "Brain" object recognition device and corresponding sorting control device are placed in front of each storage container and can identify to a third example type of sorting device (which is referred to as "Sorter C") whether "Sorter C" should fire on certain target items to deposit them into the storage containers. Each such sorting device of "Sorter A," "Sorter B," and "Sorter C" may refer to an instance of a type of a sorting device with a different sorting mechanism (e.g., air orifice, suction, pusher, robotic arm, diverter, or otherwise) and/or an instance of a sorting device with a particular set of configured parameters (e.g., suppression thresholds, target material type(s), and target item identification thresholds). The non-target items that are not fired on by the sorting devices "Sorter A" and "Sorter B" in a sorting line will land onto the next conveyor device in the same sorting line. The last sorting device in each sorting line will perform selective recirculation by separating all the remaining items that are desired to be recirculated through the sorting lines for another pass from those of the remaining items that are not desired to be recirculated. In the example of FIG. 11, the undesired items will be discarded while the items that are selected for recirculation are transported by the recirculating conveyors back to the shared components at the source of the sorting lines.

Figure 12:
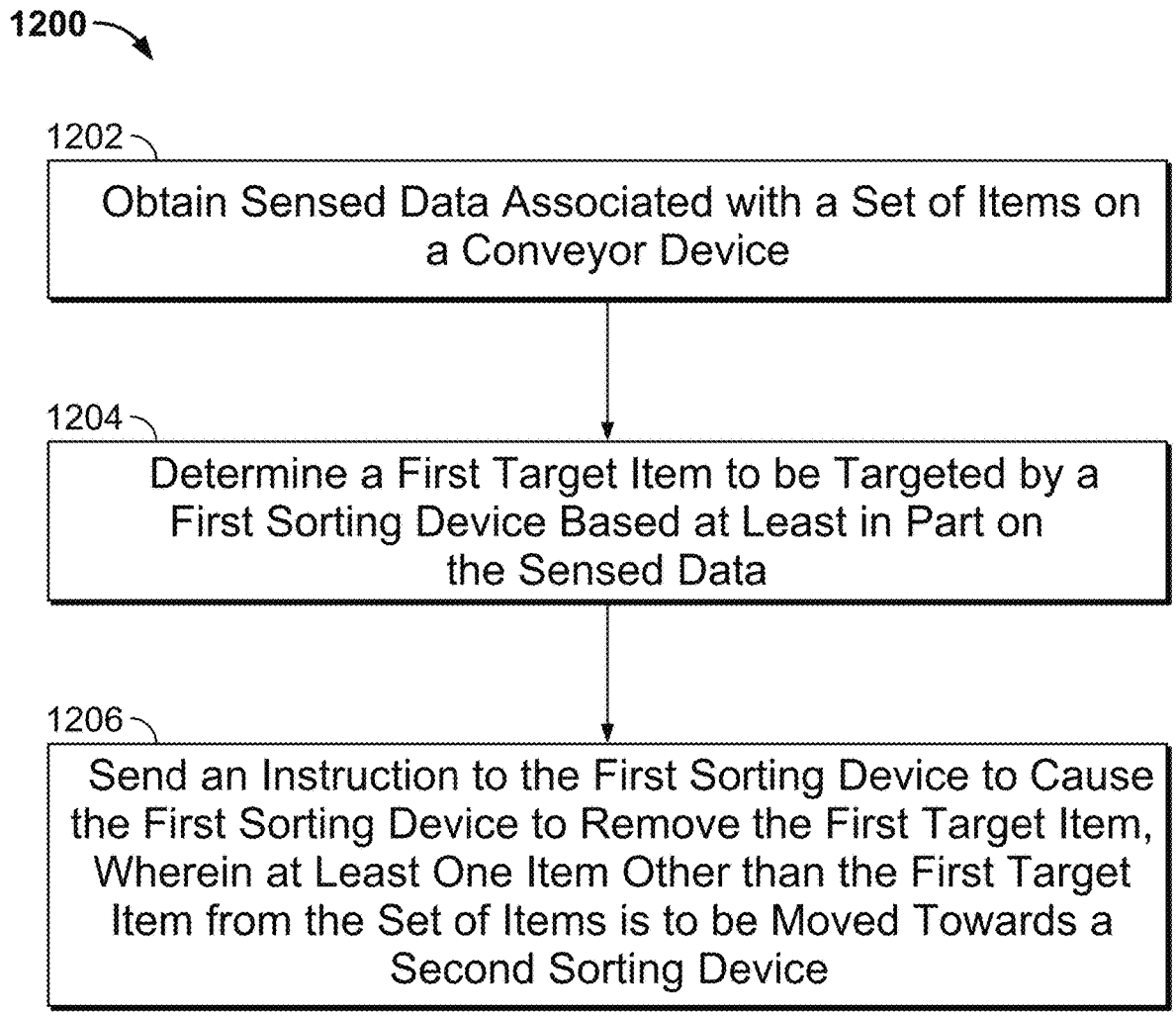
FIG. 12 is a flow diagram showing an embodiment of a process for recirculating a set of materials in a material recovery facility.

FIG. 12 is a flow diagram showing an embodiment of a process for recirculating a set of materials in a material recovery facility. In some embodiments, process 1200 is implemented by a modular sorting unit such as modular sorting unit 100 of FIG. 1 or a material sorting facility such as the example material recovery facility of FIG. 6, the example sorting line of FIG. 7, the example material recovery facility of FIG. 10, and the example material recovery facility of FIG. 11. In some embodiments, specifically, process 1200 is implemented by a sorting control device (e.g., such as the example sorting control device of FIG. 2A) that is associated with one or more modular sorting units in a material recovery facility.

Process 1200 shows an example process in which a set of items that was not removed by a first sorting device can be recirculated towards a second sorting device for an additional pass at being sorted. Recirculating a set of items through one or more sorting devices for multiple passes may allow target items (e.g., items that are desired to be recovered) that were missed by a sorting device during one pass to potentially be removed by a sorting device in a later pass. Ultimately, the advantage of recirculating a set of items through one or more sorting devices more than once is to improve the recovery rate of desired items from the set and improve the overall recovery efficiency of the material recovery facility.

At 1202, sensed data associated with a set of items on a conveyor device is obtained. Sensed data associated with a stream of items on a conveyor device is obtained via one or more sensors. For example, one type of sensor is an object recognition device such as a camera that is pointing towards the items on the conveyor device and the resulting sensed data may be one or more images of the items.

At 1204, a first target item to be targeted by a first sorting device is determined based at least in part on the sensed data. In some embodiments, a target item is identified from the sensed data (e.g., image(s)) (e.g., by a sorting control device that corresponds to the object recognition device) for a sorting device using a set of target item criteria that has been configured for that sorting device. For example, the target item is an item that is desired to be recovered. The sorting device can be located over the conveyor device, to the side of the conveyor device, or at the end of the conveyor device.

At 1206, an instruction is sent to the first sorting device to cause the first sorting device to remove the first target item, wherein at least one item other than the first target item from the set of items is to be moved towards a second sorting device. An instruction is sent (e.g., by the sorting control device) to the sorting device to instruct the sorting device to perform a sorting action to remove the target item from the stream of materials. In a first example, where the sorting device is located at the end of the conveyor device, the sorting device can remove the target item out of the stream of materials by deflecting (e.g., using a physical paddle or an airflow) the target item, after it falls off of the conveyor device, into a collection container. In a second example, where the sorting device is located over the conveyor device, the sorting device can remove the target item off of the conveyor device by suctioning the target item and then dropping the picked-up target item into a collection container. In a third example, where the sorting device is located on the side of the conveyor device, the sorting device can remove the target item off of the conveyor device by pushing the target item into a collection container (e.g., located on the other side of the conveyor device).

The other items that were not removed by this first sorting device are then transported (e.g., by a conveyor device) to a second sorting device that is of the same type of sorting device as the first sorting device. For example, the first sorting device and the second sorting device can be the same type of sorting device by using the same type of sorting mechanisms. In some embodiments, prior to reaching the second sorting device, sensors are used to capture sensed data associated with this remaining set of items, the sensed data is analyzed to determine at least one target item among the set, and then the second sorting device is instructed to remove the at least one target item. For example, the second sorting device can be instructed to perform a sorting action on a target item on which firing by the first sorting device was suppressed and/or on a target item for which the first sorting device had unsuccessfully removed from the stream of items. In a first example, the first sorting device can be associated with a first modular sorting unit and this other, second sorting device can be associated with a second modular sorting unit. In a second example, the remaining set of items are recirculated back to the same sorting device after being passed through the same object recognition device associated with the sorting device (i.e., the "first" sorting device and the "second" sorting device are actually the same sorting device). In a third example, the remaining set of items are recirculated to a second sorting device that is located in a different sorting line than the one in which the first sorting device is located.

In some embodiments, the set of items that remain in the stream after passing through the second sorting device (e.g., items that were not fired on by the second sorting device) can be recirculated back to the first sorting device (e.g., via a recirculation conveyor, air ducting, or other methods of conveyance) for another pass through the object recognition device/sorting control device associated with the first sorting device, and then potentially towards the second sorting device again, and so forth, until a stop condition is met.

Figure 13:
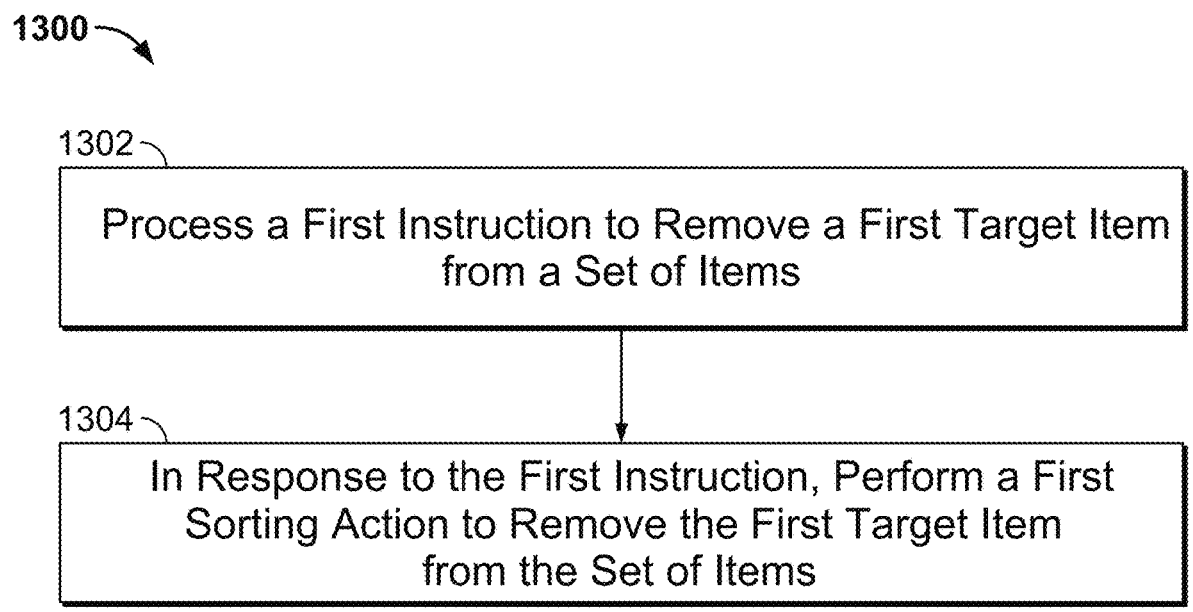
FIG. 13 is a flow diagram showing an embodiment of a process for recirculating a set of materials in a material recovery facility.

FIG. 13 is a flow diagram showing an embodiment of a process for recirculating a set of materials in a material recovery facility. In some embodiments, process 1300 is implemented by a modular sorting unit such as modular sorting unit 100 of FIG. 1 or a material sorting facility such as the example material recovery facility of FIG. 6, the example sorting line of FIG. 7, the example material recovery facility of FIG. 10, and the example material recovery facility of FIG. 11. In some embodiments, specifically, process 1300 is implemented by a sorting device (e.g., such as the example sorting device of FIG. 2B) that is associated with one or more modular sorting units in a material recovery facility.

At 1302, a first instruction to remove a first target item from a set of items is processed. In various embodiments, the instruction is received from a sorting control device. In some embodiments, the instruction was generated by a sorting control device using a process such as process 1200 of FIG. 12. In some embodiments, the instruction was generated by a processor that is local to the sorting device. In some embodiments, the instruction was generated by a processor that is remote to the sorting device (e.g., such as a processor that is associated with a cloud server or located elsewhere within the material recovery facility). In some embodiments, the instruction can describe when the sorting device should perform a sorting action ("fire") and/or how the sorting device should perform the sorting action. For example, the first instruction can instruct the sorting device to perform the sorting action using a selected portion of its sorting mechanisms for a prescribed duration of time using a prescribed amount of force.

At 1304, in response to the first instruction, a first sorting action is performed to remove the first target item from the set of items. The sorting device will perform the sorting action on a target item in accordance with the instruction. For example, the target item on which the sorting action was performed is deposited into a collection mechanism. The sorting device is configured to perform the sorting action based on the sorting device type of the sorting device. For example, the type of the sorting device is associated with the type of sorting mechanisms that are employed by the sorting device. In a first example, where the sorting device uses one or more arrays of air orifices as sorting mechanisms, the sorting device can perform the sorting action on the target item by shooting airflow(s) at the target item, after the target item falls off of the conveyor device, to deflect the target item into a collection container. In a second example, where the sorting device uses one or more suction cups that are actuated by robotic arms, the sorting device can perform the sorting action by lowering the suction cups onto the target item, picking up the suctioned target item off the conveyor device, and then dropping the picked-up target item into a collection container. In a third example, where the sorting device comprises one or more air vents, the sorting device can perform a sorting action on the target item by vacuuming the target item off of the conveyor device through a tube at the other end of which the target item will drop into a collection container.

The remaining items that the first sorting device was not instructed to remove are to be transported (e.g., via a conveyor device) towards another sorting device. For example, the first sorting device and the second sorting device can be the same type of sorting device by using the same type of sorting mechanisms. In some embodiments, prior to reaching the second sorting device, sensors are used to capture sensed data associated with this remaining set of items, the sensed data is analyzed to determine at least one target item among the set, and then the second sorting device is instructed to remove the at least one target item. For example, the second sorting device can be instructed to perform a sorting action on a target item on which firing by the first sorting device was suppressed and/or on a target item for which the first sorting device had unsuccessfully removed from the stream of items. In a first example, the first sorting device can be associated with a first modular sorting unit and this other, second sorting device can be associated with a second modular sorting unit. In a second example, the remaining set of items are recirculated back to the same sorting device after being passed through the same object recognition device associated with the sorting device (i.e., the "first" sorting device and the "second" sorting device are actually the same sorting device). In a third example, the remaining set of items are recirculated to a second sorting device that is located in a different sorting line other than the one in which the first sorting device is located.

Figure 14:
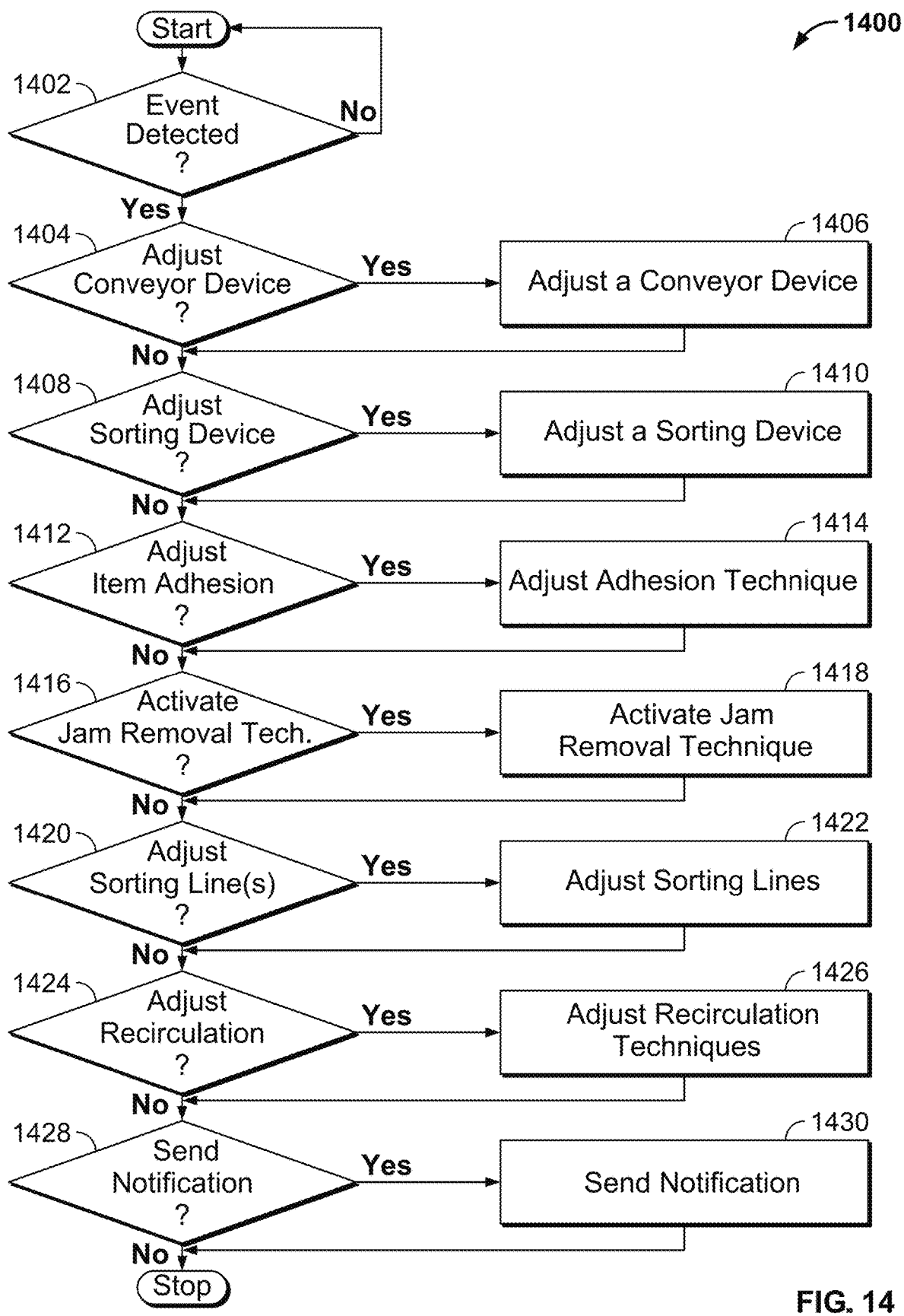
FIG. 14 is a flow diagram showing an example of a process for dynamically reconfiguring tunable parameters associated with a material recovery facility.

FIG. 14 is a flow diagram showing an example of a process for dynamically reconfiguring tunable parameters associated with a material recovery facility. In some embodiments, process 1400 is implemented by a modular sorting unit such as modular sorting unit 100 of FIG. 1, the example material recovery facility of FIG. 6, the example sorting line of FIG. 7, the example material recovery facility of FIG. 10, or the example material recovery facility of FIG. 11.

Process 1400 shows an example of a material recovery facility in which different tunable parameters can be adjusted in response to events detected at the facility. In various embodiments, the tunable parameters for an entire or at least portion of a material recovery facility can be reconfigured/adjusted/activated programmatically based on configured rules and/or a trained machine learning model for outputting updated parameters in response to an input of a detected event. Process 1400 may be repeated to continuously monitor for and accommodate events that occur at the material recovery facility. By programmatically adjusting various aspects of the material recovery facility in response to detected events, less human intervention is needed to monitor and manually modify the updating of sorting parameters, which ultimately leads to greater efficiency and cost savings.

At 1402, an event is detected. An event is detected with respect to the material recovery facility. In some embodiments, the event is detected by one or more sensors (e.g., an infrared camera, visual spectrum camera, volumetric sensing, or some combination thereof or other sensed inputs) that are placed along one or more sorting lines of the material recovery facility. In some embodiments, the detected event is a user input via a user interface. In some embodiments, the detected event is a measured metric (e.g., a purity level or a recovery rate) that is associated with the recovered contents of one or more collection containers at the material recovery facility.

In some embodiments, the detected event is a received metric that is determined based on an indication received from or a query to an external source (e.g., third party server or a cloud server). In a first example, if a received market-related metric indicates that Material Type A is in high demand (e.g., a demand side interest), then the material recovery facility can be dynamically reconfigured to target more of items of Material Type A. In a second example, if a received metric indicates that more items of Material Type B are included in the stream of materials to be sorted at the material recovery facility (e.g., a supply side metric), then the material recovery facility can be dynamically reconfigured to target more items of Material Type B. In a third example, if a received metric indicates that it is more economical to ship a large quantity of Material Type C at once, then the material recovery facility can be dynamically reconfigured to target more items of Material Type C. Other examples of received metrics may include a weather-related metric or a metric related to the recovered materials in a different material recovery facility.

At 1404, it is determined whether a conveyor device is needed to be adjusted. In the event that a conveyor device is needed to be adjusted, control is transferred to 1406. Otherwise, in the event that a conveyor device is not needed to be adjusted, control is transferred to 1408. For example, one or more conveyor devices of the material recovery facility may be adjusted when there is a jam detected or when the speed of sorting through items is to be adjusted.

At 1406, a conveyor device is adjusted. For example, a conveyor device that is determined to be adjusted can have its speed and/or angle adjusted (e.g., to resolve an issue of the detected event such as to remove a jam and/or to optimize a metric such as increasing the throughput of the material recovery facility).

At 1408, it is determined whether a sorting device is needed to be adjusted. In the event that a sorting device is needed to be adjusted, control is transferred to 1410. Otherwise, in the event that a sorting device is not needed to be adjusted, control is transferred to 1412. For example, a sorting device can be adjusted to change the manner in which the device performs sorting.

At 1410, a sorting device is adjusted. In a first example, a sorting device can be adjusted to target different items. In a second example, a sorting device can be adjusted to perform the removal of a target item using a different degree of force (e.g., a different force of airflow to deflect the target item into a collection container). In a third example, a sorting device can be adjusted to perform sorting using a different set of suppression criteria (i.e., the sensitivity with which the sorting device determines whether or not to suppress firing on a target item that is in proximity to a non-target item can be adjusted). In a fourth example, a sorting device can be adjusted to drop/deflect target items into one or more new collection containers (e.g., the sorting device can be adjusted to drop off or deflect target items into different locations associated with different collection containers).

At 1412, it is determined whether an item adhesion technique is needed to be adjusted. In the event that an item adhesion technique is needed to be adjusted, control is transferred to 1414. Otherwise, in the event that an item adhesion technique is not needed to be adjusted, control is transferred to 1416. For example, an item adhesion may be adjusted when it is determined that items are moving relative to the surface of a conveyor device (e.g., because of the speed of the conveyor belt and/or the weight/shape of the items), which is undesirable because the movement could interfere with the calibrated alignment between the conveyor device and a corresponding sorting device.

At 1414, an item adhesion technique is adjusted. For example, an item adhesion technique comprises a technique that causes items to stay more static relative to the surface of a conveyor device. Specific examples of item adhesion techniques include a fan, air lamination, and/or electric adhesion. An item adhesion technique can be adjusted by increasing or decreasing the degree to which the technique causes items to remain static in position on the conveyor device(s).

At 1416, it is determined whether a jam removal technique is needed to be activated. In the event that a jam removal technique is needed to be activated, control is transferred to 1418. Otherwise, in the event that a jam removal technique is not needed to be activated, control is transferred to 1420. For example, a jam can be detected along a sorting line if it appears that the items are moving slower than expected on the conveyor device(s).

At 1418, a jam removal technique is activated. For example, a jam removal technique is a mechanical or airflow-based technique that is activated to create more physical separation between the items in the stream of materials.

At 1420, it is determined whether sorting line(s) are needed to be adjusted. In the event that sorting line(s) are needed to be adjusted, control is transferred to 1422. Otherwise, in the event that sorting line(s) are not needed to be adjusted, control is transferred to 1424. For example, one or more sorting lines in a material recovery facility can be adjusted in response to a detection for a different throughput at the facility and/or the detected quantity of items to be sorted at the facility.

At 1422, sorting line(s) are to be adjusted. Where there is a detected need for greater throughput and/or a detected large quantity of items to be sorted, for example, additional sorting lines can be activated.

At 1424, it is determined whether recirculation techniques are needed to be adjusted. In the event that techniques are needed to be adjusted, control is transferred to 1426. Otherwise, in the event that techniques are not needed to be adjusted, control is transferred to 1428. For example, recirculation with respect to one or more sorting lines in a material recovery facility can be adjusted in response to a detection for more recirculation of the same set of materials and/or a user input to recirculate items to a different location within the material recovery facility.

At 1426, recirculation techniques are to be adjusted. For example, different recirculation routes/techniques can be activated (or deactivated) to enable (or disable) more instances of recirculation of a set of items.

At 1428, it is determined whether a notification should be sent. In the event that a notification should be sent, control is transferred to 1430. Otherwise, in the event that a notification should not be sent, the process ends. For example, a notification can be sent to a user interface and/or to a user's mobile device to inform the user of manual intervention that is needed at the material recovery facility.

At 1430, a notification is sent. For example, a notification can be sent to a staff member that is associated with operating the material recovery facility to inform the staff member of an update at the facility. For example, the update at the facility may be informational and/or to inform the staff member to manually reconfigure a portion of the facility such as add or remove modular sorting units in one or more sorting lines (e.g., in response to an increase or a decrease in the number of items to sort) and/or manually change the recirculation equipment to reroute the destination of the recirculation of items within the facility. In another example, a notification can be sent to a third party such as a supplier of items to sort at the facility to inform the supplier that more materials of a particular type are in demand (e.g., by buyers of recovered materials) and should be sent to the facility for sorting.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a first sorting device configured to:
   process a first instruction, from a first sorting control device, to remove a first target item from a set of items traveling along a first conveyor device, wherein the first sorting device, the first sorting control device, and the first conveyor device are associated with a first sorting unit, wherein the first target item and a second target item were determined by the first sorting control device to match a set of target item criteria, wherein sorting of the second target item by the first sorting device was determined to be suppressed by the first sorting control device based at least in part on a set of suppression criteria; and
   in response to the first instruction, perform a first sorting action to remove the first target item from the set of items and omit performing a second sorting action to remove the second target item from the set of items,
   wherein the set of items excluding at least the first target item is to be transported towards a second sorting device via a second conveyor device, and wherein the second sorting device, a second sorting control device, and the second conveyor device are associated with a second sorting unit;
   wherein the second sorting control device is configured to receive, from the first sorting control device associated with the first sorting unit, a determination that the second target item was not sorted by the first sorting device and should be targeted for sorting by the second sorting device; and
   wherein the second sorting device is configured to perform a third sorting action to remove the second target item from the set of items excluding at least the first target item in response to receiving a second instruction from the second sorting control device.

2. The system of claim 1, wherein the first sorting device uses a first sorting mechanism and the second sorting device uses a second sorting mechanism, wherein the first sorting mechanism and the second sorting mechanism are the same type of sorting mechanism.

3. The system of claim 1, wherein the first sorting device uses a first sorting mechanism and the second sorting device uses a second sorting mechanism, wherein the first sorting mechanism and the second sorting mechanism are different.

4. The system of claim 1, further comprising:
   wherein the first conveyor device is set at an angle relative to a plane on which the first conveyor device is located, and wherein the first conveyor device is configured to transport the set of items from a first height relative to the plane to a second height relative to the plane, wherein the first sorting device is configured to perform the first sorting action to remove the first target item from the set of items.

5. The system of claim 1, further comprising:
   wherein the first conveyor device is set at an angle relative to a plane on which the first conveyor device is located, and wherein the first conveyor device is configured to transport the set of items from a lower height relative to the plane to a higher height relative to the plane, wherein the first sorting device is configured to perform the first sorting action to remove the first target item from the set of items after the first target item falls off of the first conveyor device.

6. The system of claim 5, wherein the set of items excluding at least the first target item lands on the second conveyor device, wherein the second conveyor device is located on substantially a same level as the first conveyor device.

7. The system of claim 1, further comprising:
the first sorting control device configured to:
- obtain sensed data associated with the set of items on the first conveyor device;
- determine that the first target item is to be targeted by the first sorting device based at least in part on the sensed data and the set of target item criteria; and
- send the first instruction to the first sorting device.

8. The system of claim 7, wherein the sensed data comprises one or more images of the set of items.

9. The system of claim 1, further comprising:
the first sorting control device configured to:
- obtain sensed data associated with the set of items on the first conveyor device; and
- determine that a non-target item is not to be collected and not to be transported towards the second sorting device based at least in part on the sensed data.

10. The system of claim 1, further comprising:
the first sorting control device configured to:
- obtain sensed data associated with the set of items on the first conveyor device;
- determine that the second target item is not to be targeted by the first sorting device based at least in part on the set of suppression criteria; and
- send, to the second sorting control device, the determination to cause the second sorting control device to instruct the second sorting device to target the second target item.

11. The system of claim 1, wherein the first sorting device and the second sorting device belong to a same sorting line within a material recovery facility.

12. The system of claim 1, further comprising:
the first sorting control device configured to:
- determine that an event has been detected; and
- in response to the event, perform dynamic reconfiguration including to update a parameter associated with the system.

13. The system of claim 12, wherein the event comprises one or more of the following: data detected by one or more sensors, a user input, a measured metric associated with recovered items, and a received metric that is received from an external source.

14. The system of claim 12, wherein the parameter is associated with one or more of the following: a speed associated with the first conveyor device, an angle associated with the first conveyor device, the set of target item criteria associated with the first sorting device, and the set of suppression criteria associated with the first sorting device.

15. The system of claim 12, wherein the parameter is associated with one or more of the following: a technique for adhering items to the first conveyor device associated with the system, a jam removal technique associated with the system, a configuration of one or more sorting lines associated with the system, and a configuration associated with recirculation of items associated with the system.

16. The system of claim 12, wherein the parameter is updated based at least in part on a received metric, a machine learning model, or on reconfiguration rules determined based on historical testing.

17. The system of claim 1, wherein material that has not been recovered by both the first sorting device and the second sorting device is recirculated through the first sorting device and the second sorting device so that it may be recovered.

18. A method, comprising:
- processing, at a first sorting device, a first instruction from a first sorting control device to remove a first target item from a set of items traveling along a first conveyor device, wherein the first sorting device, the first sorting control device, and the first conveyor device are associated with a first sorting unit, wherein the first target item and a second target item were determined by the first sorting control device to match a set of target item criteria, wherein sorting of the second target item by the first sorting device was determined to be suppressed by the first sorting control device based at least in part on a set of suppression criteria; and
- in response to the first instruction, performing a first sorting action to remove the first target item from the set of items and omitting to perform a second sorting action to remove the second target item from the set of items,
  - wherein the set of items excluding at least the first target item is to be transported towards a second sorting device via a second conveyor device, and wherein the second sorting device, a second sorting control device, and the second conveyor device are associated with a second sorting unit;
  - wherein the second sorting control device is configured to receive, from the first sorting control device associated with the first sorting unit, a determination that the second target item was not sorted by the first sorting device and should be targeted for sorting by the second sorting device; and
  - wherein the second sorting device is configured to perform a third sorting action to remove the second target item from the set of items excluding at least the first target item in response to receiving a second instruction from the second sorting control device.

19. The method of claim 18, further comprising:
- obtaining sensed data associated with the set of items on the first conveyor device;
- determining that the first target item is to be targeted by the first sorting device based at least in part on the sensed data and the set of target item criteria; and
- sending the first instruction to the first sorting device.

20. The method of claim 18, further comprising:
- determining that an event has been detected; and
- in response to the event, performing dynamic reconfiguration including to update a parameter associated with a system comprising the first sorting device.

* * * * *

UNITED STATES PATENT AND TRADEMARK OFFICE
CERTIFICATE OF CORRECTION

| | |
|---|---|
| PATENT NO. | : 11,679,419 B2 |
| APPLICATION NO. | : 17/409624 |
| DATED | : June 20, 2023 |
| INVENTOR(S) | : Cameron D. Douglas et al. |

It is certified that error appears in the above-identified patent and that said Letters Patent is hereby corrected as shown below:

In the Specification

In Column 9, Line 46, delete "AB" and insert --A/B--, therefor.

In Column 11, Line 59, delete "angle, a" and insert --angle α--, therefor.

In Column 11, Line 60, delete "angle (a)" and insert --angle (α)--, therefor.

Signed and Sealed this
Fourteenth Day of November, 2023

Katherine Kelly Vidal
*Director of the United States Patent and Trademark Office*